US012737012B2

(12) United States Patent
Balaji et al.

(10) Patent No.: US 12,737,012 B2
(45) Date of Patent: Sep. 15, 2026

(54) COMPUTING DEVICE COVER

(71) Applicant: Apple Inc., Cupertino, CA (US)

(72) Inventors: Santhana K Balaji, Campbell, CA (US); Taylor H Gilbert, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 202 days.

(21) Appl. No.: 18/429,291

(22) Filed: Jan. 31, 2024

(65) Prior Publication Data

US 2024/0385655 A1 Nov. 21, 2024

Related U.S. Application Data

(60) Provisional application No. 63/503,348, filed on May 19, 2023.

(51) Int. Cl.
*G06F 1/16* (2006.01)
*A45C 11/00* (2006.01)
*A45C 13/00* (2006.01)

(52) U.S. Cl.
CPC ............ *G06F 1/1675* (2013.01); *A45C 11/00* (2013.01); *A45C 13/005* (2013.01); *G06F 1/166* (2013.01); *A45C 11/002* (2025.01); *A45C 11/003* (2025.01); *A45C 2200/15* (2013.01)

(58) Field of Classification Search
CPC . A45C 11/002; A45C 11/003; A45C 2200/15; G06F 1/1629; G06F 1/166; G06F 1/1681
USPC .................................................... 16/225, 250
See application file for complete search history.

(56) References Cited

U.S. PATENT DOCUMENTS 4,163,303 A * 8/1979 Hanna ........................ E05D 9/00 24/444
7,425,103 B2 * 9/2008 Perez-Sanchez ......... B64C 9/02 403/291
8,132,670 B1 * 3/2012 Chen ......................... G06F 1/18 206/45.24

(Continued)

FOREIGN PATENT DOCUMENTS

JP 2011227698 A 11/2011
JP 2014235544 A 12/2014

(Continued)

OTHER PUBLICATIONS

Logitech, Folio Touch, available at: https://www.logitech.com/en-us/products/ipad-keyboards/folio-touch.html, accessed as early as Nov. 1, 2022.

(Continued)

*Primary Examiner* — Adrian S Wilson
(74) *Attorney, Agent, or Firm* — Dorsey & Whitney LLP

(57) ABSTRACT

A computing device cover that can include a base layer and a split layer, the split layer including a fixed portion attached to the base layer, a rotatable portion, and a rotation member pivotably connecting the rotatable portion to the fixed portion, and a cover layer attached to the split layer and positioned between the base layer and the split layer. The cover layer can include pre-drawn fabric positionable adjacent to the rotation member and a concealed tearable area. The computing device cover is configured to support a computing device in the upright position. To do this, several different embodiments are presented.

19 Claims, 14 Drawing Sheets

(56) References Cited

U.S. PATENT DOCUMENTS 8,264,310 B2 * 9/2012 Lauder .................. G06F 1/1616 361/679.01
8,305,741 B2 11/2012 Chatterjee
8,498,100 B1 * 7/2013 Whitt, III ............. H05K 5/0234 361/679.28
8,826,495 B2 * 9/2014 Jauvtis ................. G06F 1/1681 16/225
8,954,117 B2 2/2015 Huang
9,072,352 B2 * 7/2015 Sartee ................. H04M 1/0266
9,116,550 B2 * 8/2015 Siddiqui ............... G06F 3/0219
9,118,195 B2 8/2015 Foster
9,326,576 B2 * 5/2016 Sartee ................. H04M 1/0266
9,423,826 B2 * 8/2016 McCracken .......... G06F 1/1618
9,575,515 B2 * 2/2017 Leon ...................... F16M 11/06
D780,758 S 3/2017 Bailey et al.
9,706,089 B2 * 7/2017 Beck ..................... G06F 1/1681
9,762,278 B2 9/2017 Griffin et al.
9,819,216 B2 11/2017 Klawon et al.
9,883,583 B2 * 1/2018 Cousins ................... H05K 1/09
10,063,269 B2 8/2018 Smith et al.
10,227,808 B2 * 3/2019 Siddiqui ................... E05D 3/12
10,299,375 B2 5/2019 Kim et al.
10,474,199 B2 11/2019 Longo et al.
10,488,883 B2 11/2019 Rothkopf
10,551,878 B2 2/2020 Longo et al.
10,659,580 B2 5/2020 Lee et al.
10,683,591 B1 * 6/2020 Podhajny ............... D03D 11/02
10,817,029 B1 10/2020 Files et al.
10,892,625 B1 1/2021 Franklin et al.
11,009,918 B2 5/2021 Oakeson et al.
11,009,921 B1 * 5/2021 Bharadwaj ............ G06F 1/1694
11,016,533 B1 5/2021 Takahashi et al.
11,061,444 B2 * 7/2021 Nakamura .............. G06F 1/162
11,092,997 B2 * 8/2021 Balaji ................... G06F 1/1616
11,184,989 B2 11/2021 Kang et al.
11,201,484 B2 12/2021 Weber et al.
11,307,612 B2 * 4/2022 Hosokai ................ G06F 1/1652
11,409,331 B2 * 8/2022 Hosokai ................ G06F 1/1656
11,599,178 B2 3/2023 Rivolta et al.
11,726,522 B2 * 8/2023 Balaji ................... G06F 1/1626 361/679.09
11,977,412 B2 5/2024 Miles et al.
12,282,358 B1 4/2025 Piper et al.
12,310,470 B2 5/2025 Whitten et al.
12,310,471 B2 5/2025 Lee et al.
12,411,558 B2 9/2025 Balaji et al.
2001/0037538 A1 * 11/2001 Duperray ............. B25J 17/0241 16/225
2002/0133906 A1 * 9/2002 Fedon ....................... E05D 1/02 16/225
2006/0226040 A1 * 10/2006 Medina ................. G06F 1/1616 361/679.55
2008/0053851 A1 * 3/2008 Ko ........................ A45C 11/00 206/320
2008/0125195 A1 * 5/2008 Maenpaa ............ H04M 1/0216 361/600
2008/0278894 A1 11/2008 Chen et al.
2009/0160400 A1 6/2009 Woud
2009/0303208 A1 12/2009 Case et al.
2010/0044582 A1 2/2010 Cooper et al.
2010/0131691 A1 5/2010 Hornyak et al.
2010/0189497 A1 * 7/2010 Hughes, Sr. ............ E01F 9/629 16/225
2011/0280641 A1 11/2011 Jiang
2012/0013781 A1 1/2012 Yamagiwa
2012/0287565 A1 * 11/2012 Bennett, Jr. ............ F16M 11/38 361/679.01
2013/0077236 A1 3/2013 Becze et al.
2013/0086397 A1 4/2013 Uchida
2013/0106353 A1 5/2013 Foster
2013/0214661 A1 * 8/2013 McBroom ............... G06F 1/166 312/325
2013/0216740 A1 8/2013 Russell-Clarke et al.
2013/0229100 A1 * 9/2013 Siddiqui .............. H01H 13/785 248/688
2013/0229756 A1 9/2013 Whitt et al.
2013/0232353 A1 9/2013 Belesiu et al.
2013/0235083 A1 9/2013 Bao et al.
2014/0075061 A1 3/2014 Fritchman et al.
2014/0191034 A1 7/2014 Glanzer et al.
2014/0195826 A1 7/2014 Wojcik et al.
2014/0253024 A1 9/2014 Rautiainen et al.
2014/0283979 A1 * 9/2014 Kenney ................... B29C 65/18 156/182
2014/0321052 A1 10/2014 Diebel et al.
2014/0355200 A1 12/2014 Thiers
2015/0084589 A1 3/2015 Tsai et al.
2015/0091882 A1 4/2015 Dwarka et al.
2015/0115943 A1 4/2015 Jin et al.
2015/0116362 A1 4/2015 Aurongzeb et al.
2015/0116364 A1 4/2015 Aurongzeb et al.
2015/0277508 A1 * 10/2015 McCracken ........... H01H 13/86 224/191
2015/0278529 A1 10/2015 Cho
2015/0281413 A1 * 10/2015 Longo ................. H04M 1/0214 361/679.29
2015/0282354 A1 * 10/2015 Spollen .................. A45C 11/00 206/45.2
2015/0284980 A1 * 10/2015 Mccullough ........... A47B 96/00 16/365
2015/0286251 A1 10/2015 Emslie
2015/0316394 A1 11/2015 Kim et al.
2015/0375894 A1 * 12/2015 Idehara .................. A45C 11/00 206/45.24
2016/0065702 A1 3/2016 Carnevali
2016/0066453 A1 3/2016 Quehl et al.
2016/0109908 A1 * 4/2016 Siddiqui ............... G06F 1/1681 16/225
2016/0154428 A1 * 6/2016 Senatori ................ G06F 1/1662 361/679.27
2016/0252927 A1 * 9/2016 Senatori ................ G06F 1/1681 361/679.27
2016/0259378 A1 9/2016 Oliver et al.
2016/0275648 A1 9/2016 Honda et al.
2017/0010657 A1 1/2017 Schneider
2017/0012662 A1 1/2017 Balaji et al.
2017/0013955 A1 * 1/2017 Lin ........................ A47B 3/087
2017/0045911 A1 * 2/2017 Ho .......................... G06F 1/166
2017/0054834 A1 * 2/2017 Longo ................... G06F 1/1683
2017/0063419 A1 * 3/2017 Griffin, II ............ H04B 1/3888
2017/0075391 A1 3/2017 Longo et al.
2017/0083068 A1 3/2017 Kashyap et al.
2017/0250719 A1 * 8/2017 Stryker ................ H04B 1/3888
2018/0081483 A1 3/2018 Camp et al.
2018/0113493 A1 * 4/2018 Silvanto .............. E05D 11/0054
2018/0199434 A1 7/2018 Mckeeby et al.
2018/0241429 A1 8/2018 Carnevali
2019/0129511 A1 5/2019 Clark
2019/0278337 A1 9/2019 Hu et al.
2020/0042048 A1 * 2/2020 Quinn ................... G06F 1/1656
2020/0096579 A1 3/2020 Renda et al.
2020/0137882 A1 4/2020 Coakley et al.
2020/0150720 A1 5/2020 Wang
2020/0241604 A1 * 7/2020 Nakamura ............ G06F 1/1618
2020/0241827 A1 7/2020 Aurongzeb et al.
2020/0392759 A1 12/2020 Morrison et al.
2021/0018961 A1 * 1/2021 Han ...................... G06F 1/1681
2021/0026409 A1 1/2021 Miles et al.
2021/0096597 A1 * 4/2021 Balaji ................... G06F 1/1654
2021/0232234 A1 7/2021 Morrison et al.
2021/0240282 A1 8/2021 Gajiwala et al.
2021/0278882 A1 * 9/2021 Li ............................ E05D 1/02
2021/0328394 A1 10/2021 Carnevali et al.
2021/0341967 A1 * 11/2021 Balaji ................... G06F 1/1632
2021/0365066 A1 * 11/2021 Kinoshita ............. G06F 1/1679
2022/0361266 A1 11/2022 Ahmed et al.
2023/0088731 A1 * 3/2023 Bitz .................... H04M 1/0216 361/679.28
2023/0148721 A1 * 5/2023 Lee .................... A45C 13/1069 224/183
2023/0185449 A1 6/2023 Lee et al.

(56) References Cited

U.S. PATENT DOCUMENTS

| | | | | |
|---|---|---|---|---|
| 2024/0180306 | A1 | 6/2024 | Malafaia | |
| 2024/0248516 | A1 | 7/2024 | Gillett et al. | |
| 2024/0385657 | A1* | 11/2024 | Balaji .................. | A45C 13/005 |
| 2024/0385661 | A1 | 11/2024 | Balaji et al. | |
| 2024/0385696 | A1 | 11/2024 | Balaji et al. | |
| 2024/0385697 | A1 | 11/2024 | Balaji et al. | |

FOREIGN PATENT DOCUMENTS

| | | | | |
|---|---|---|---|---|
| JP | 2015181015 | A | 10/2015 | |
| JP | 1569358 | S | 1/2017 | |
| JP | 2017500661 | A | 1/2017 | |
| JP | 2017054471 | A | 3/2017 | |
| JP | 2017188141 | A | 10/2017 | |
| JP | 2018526750 | A | 9/2018 | |
| JP | 2019200574 | A | 11/2019 | |
| JP | 2022138769 | A | 9/2022 | |
| JP | 2024167096 | A | 11/2024 | |
| JP | 2024167097 | A | 11/2024 | |
| KR | 20220016734 | A | 2/2022 | |
| WO | WO-2015030633 | A2 * | 3/2015 | ........... G06F 3/1454 |

OTHER PUBLICATIONS

Samsung, Galaxy Tab S8 / S7 Book Cover Keyboard, Black, available at: https://www.samsung.com/us/mobile/mobile-accessories/tablets/galaxy-tab-s8-galaxy-tab-s7-book-cover-keyboard-black-ef-dt870ubeguj/, accessed as early as Nov. 1, 2022.

Parsian, Mohammadali, U.S. Patent Application titled "Retention Mechanisms for Coupled Devices", 40 pages.

* cited by examiner

COMPUTING DEVICE COVER

CROSS-REFERENCE TO RELATED APPLICATION(S)

This claims priority to U.S. Provisional Patent Application No. 63/503,348, filed 19 May 2023, and entitled "Computing Device Cover," the disclosure of which is hereby incorporated by reference in its entirety.

FIELD

The described embodiments relate generally to electronic accessories and covers for computing devices. More particularly, the present embodiments relate to a cover that includes multiple layers, a kickstand, and protective elements for a camera turret.

BACKGROUND

Portable computing devices have grown in popularity and ubiquity worldwide in recent years. The convenience and adaptability of portable computing devices such as tablet computers and smart phones have therefore helped serve the needs of users for many purposes. When using a portable computing device such as a tablet or smartphone, it is common to use a computing device case or cover to protect the device from damage and provide additional functionality. Although convenient for protecting portable computing devices and increased productivity, traditional portable computing device covers and cases can be inconvenient to use for various reasons. For example, the materials included in computing device covers can tear or experience other aberrations after repeated use, such as along the spine or certain places of movement, stretching, or rotation. Computing device covers can also lose elasticity in some portions and therefore functionality over time. In this regard, conventional computing device covers fail to provide a desired user experience and aesthetic appeal, and some even fail to provide adequate protection to the computing device over extended periods of time. As a result, there is a constant need for improvements in portable computing devices, particularly for associated cases.

SUMMARY

One or more examples of the present disclosure relates to a cover for a computing device. A computing device cover can include a base layer and a split layer, comprising a fixed portion attached to the base layer, a rotation member pivotably connected to the fixed portion, and a fabric layer attached to the split layer and positioned between the base layer and the split layer. The fabric layer can comprise a pre-drawn fabric positionable adjacent to the rotation member, with the pre-drawn fabric positionable adjacent to the rotation member and comprising a predetermined tension for controlling kinematics of the rotation member relative to the fixed portion. In at least one example, the computing device cover can include a concealed tearable area of the fabric layer is positioned between the fixed portion of the split layer and the base layer. In one example, the computing device cover can further comprise a cap positioned over the rotation member. In at least some examples, the pre-drawn fabric is positionable adjacent to an end portion of the cap. In one or more examples, the cap is adhered to at least one of the split layer or the fabric layer. In at least one example the fabric layer comprises a reinforced portion adjacent to the rotation member. In a particular example, the computing device cover can further comprise a hardstop configured to limit a range of rotation of the rotation member.

In one example, a computing device case can include a first layer, a second layer partially attached to the first layer, a portion of the second layer comprising a support portion, and a set of connection members interspaced within the second layer, the set of connection members being rotatable relative to each other to provide a rotational degree of freedom for the support portion relative to the first layer and a fabric layer positioned between the first layer and the second layer, the fabric layer comprising a tension control region defined by a combination of one or more stiffened areas and one or more flexible areas. In at least one example, a position of the support portion relative to the second layer defines a hinge angle for the set of connection members and the tension control region variably affects an amount of input torque required to rotate the support portion based on the hinge angle in response to application of a force to the support portion. In a particular example, the computing device case can further comprising a magnet positioned in at least one of the first layer or the support portion of the second layer, wherein in addition to the tension control region, the magnet is configured to variably affect the input torque to rotate the support portion. In at least some examples, the tension control region is positioned proximate to the set of connection members. In one or more examples, the tension control region comprises elongated fabric extensions interspaced by fabric cutouts. In at least one example, the tension control region is at least partially concealed between the first layer and the second layer. In at least some examples, the tension control region comprises one or more areas stiffened with adhesive. In one or more examples, the set of connection members comprises friction hinges.

In one example, a computing device cover can include a back panel removably attachable to a computing device, the back panel comprising, a first surface abuttable against the computing device and a second surface opposing the first surface, an upper panel comprising a hidden surface attached to the second surface, a hinge comprising a hinge shape and a hinge position, a kickstand rotatably attached to the upper panel via the hinge, the kickstand comprising a kickstand surface abuttable against the second surface, and a sheet of fabric covering the kickstand surface, the hinge, and the hidden surface, wherein the sheet of fabric visually conceals the hinge shape and the hinge position from an unaided human eye. In a particular example, the computing device cover further comprises a stiffener positioned between the hinge and the sheet of fabric, wherein the sheet of fabric at the hinge is shaped to the stiffener. In one example, the sheet of fabric comprises a first predetermined tension or compression at a first hinge angle of the hinge, and a second predetermined tension or compression at a second hinge angle of the hinge, the second predetermined tension or compression differing from the first predetermined tension or compression. In at least some examples, the sheet of fabric comprises a continuous sheet of fabric. In one or more examples, the kickstand is rotatable relative to the back panel within a range extending from about 0 degrees to about 85 degrees.

The present disclosure additionally relates to a computing device cover that can include a back panel, comprising a rigid plate and an aperture extending through the rigid plate and sized and shaped to receive a camera enclosure of a computing device, a bumper guard surrounding a periphery of the aperture, the bumper guard comprising a material with different hardness relative to the rigid plate, and a cover material at least partially concealing the bumper guard and the back panel. In at least one example, the bumper guard comprises a first material hardness, and the rigid plate comprises a second material hardness greater than the first material hardness. In a particular example, the computing device cover can further comprise a first surface comprising a microfiber material, the microfiber material comprising nap oriented to oppose a gravitational pull on the computing device when the computing device is attached to the back panel. In at least some examples, the computing device cover can further comprise a split layer comprising a fixed portion coupled to the back panel and a kickstand rotatably attached to the fixed portion. In one or more examples, the back panel comprises a touch input surface responsive to user input via detected changes in capacitance. In at least one example, the rigid plate comprises a fiberglass material and at least a portion of the back panel comprises a paint coating over the fiberglass material.

In one example, a shell case for a computing device can include a backing configured to abut a back surface of a computing device, the backing comprising an opening, and a support member positionable within the opening and pivotably connected to an edge of the opening, wherein rotation of the support member away from the opening is configured to expose the back surface of the computing device, and sidewalls attached to the backing, the sidewalls configured to at least partially cover lateral sides of the computing device. In at least one example, the shell case can further comprise an adjustable loop configured to hold an electronic stylus. In a particular example, the adjustable loop is tensioned to retract in an absence of the electronic stylus. In one example, the adjustable loop is collapsible to a flat configuration in the absence of the electronic stylus. In at least some examples, the adjustable loop comprises a rigid portion configured to bias the electronic stylus. In one or more examples, an outer surface of the backing and the sidewalls is wrapped in a fabric material. In at least one example, the shell case can include a front cover and a pass-through hinge rotatably connecting the front cover to an interior portion of one of the sidewalls. In a particular example, at least one of the backing or one or more of the sidewalls define an indentation to access the support member. In one example, the backing and the sidewalls form a unibody component formed of a single material.

In another example, a computing device cover can include a hinged layer, comprising an anchored portion, a rotatable portion pivotably attached to the anchored portion and a cover layer, comprising a first surface configured to abut a computing device, the first surface comprising a directionally biased friction material, wherein the directionally biased friction material is oriented to resist movement of the computing device while the computing device is supported by the rotatable portion of the hinged layer, and a second surface configured to attach to the anchored portion and abut the rotatable portion. In some examples, when the computing device cover is positioned in a landscape orientation, a directional bias of the directionally biased friction material is oriented upwards to resist downward sliding of the computing device upon attachment to the cover layer. In a particular example, the computing device cover further comprises a magnet embedded within the cover layer, the magnet configured to mate with a corresponding magnet of the computing device, wherein, in addition to the directionally biased friction material, the magnet embedded within the cover layer is configured to oppose a gravitational pull on the computing device. In at least some examples, the hinged layer comprises a first outer edge, and the cover layer comprises a second outer edge flush with the first outer edge. In one or more examples, the cover layer comprises a bumper guard.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
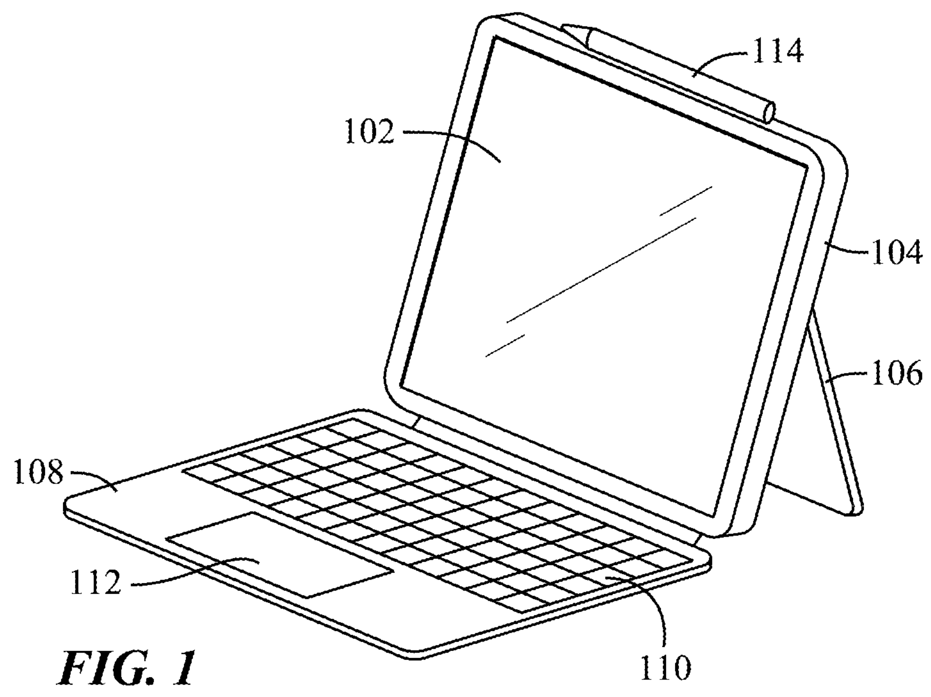
FIG. 1 illustrates an example portable computing device with a computing device cover.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates to a computing device cover that can protect a computing device while providing additional functionality. The computing device can include a rigid back panel and a kickstand, which can provide structural rigidity and durability. The computing device cover can also include hinges that can decrease the chance of premature tearing or failure of movable parts. The computing device cover can provide a user with a desirable experience by controlling the kinematics of the movable parts, the feel of the material used, and the color, shape, and aesthetics of the computing device cover. The computing device cover can also be designed in such a way as to increase manufacturability while maintaining quality and function.

A computing device cover of the present disclosure can implement a variety of different physical configurations, configurations of material, and functional components (e.g., hinges). Such elements can be used to provide myriad different device interactions and user experiences, as will be described below. For example, tensioned fabric of the computing device cover can, in combination with other components (e.g., magnets), create and induce controlled kickstand kinematics when opening and closing the kickstand. As another example, the computing device cover can include a directionally biased friction material (e.g., to resist detachment or sliding of the computing device relative to the computing device cover). In yet another example, the computing device cover can include a bumper guard to protect a camera enclosure of a computing device. In a further example, the computing device cover can include an adjustable loop for an electronic stylus that can retract, collapse, etc.

In these or other examples, the computing device cover of the present disclosure can include a tensioned fabric (e.g., a pre-drawn fabric). As mentioned, the tensioned fabric can control kickstand kinematics by rotationally biasing the kickstand at different amounts depending on the rotational angle of the kickstand relative to a hinge. In addition, the tensioned fabric can wrap around or conceal certain structural components of a computing device cover, such as hinge components. Unlike certain conventional covers, the computing device cover of the present disclosure can include fabric that can effectively stretch and retract over hinge components in a manner such that the hinge shape and hinge position are imperceptible to or visually concealed from a user (e.g., no wrinkles, creases, or other surface aberrations to expose an outline or positioning of the concealed structure of the computing device cover).

Specific aspects of the present disclosure include a base layer and a split layer. The base layer (or back panel) can include a stiff material that can increase rigidity and structural integrity. The base layer can also include a directional material that can be used to control the frictional properties as the directional material abuts the computing device, the distance between the computing device and the rigid material, and the feel of the computing device cover. Various methods of attachment can be used to secure the base layer to the computing device.

The split layer can include at least one section that is attached to the base layer, and at least one other section that is connected to the first section and free to rotate about an axis in the plane of the at least one section attached to the base layer. The at least one second section that is free to rotate can be used as a kickstand to support the computing device and base layer. The at least one rotatable section can rotate about one or more hinges contained in the split layer.

The present disclosure also relates to a computing device cover that includes a shell design. The shell can include a back panel plus sidewalls that can retain a computing device. The back panel, as mentioned above, can protect the computing device from scratches, aberrations, or other damage. The computing device shell can also include a retention system for an electronic stylus. Several embodiments are presented related to the materials and configurations of a computing device cover in accordance with these features.

These and other embodiments are discussed below with reference to FIGS. 1-30. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an example portable computing device 102 with a computing device cover 104 in accordance with one or more examples of the present disclosure. A computing device as disclosed herein can include a mobile or portable computing device, such as a smart phone computing device or a tablet computing device. The computing device 102 can include one or more of a variety of different types of computing devices, such as notebook computers, desktop computers, smart phones, servers, similar devices, and combinations thereof. Herein, the computing device 102 is shown as an example device with which aspects of the present disclosure are illustrated for convenience in providing an explanation. The computing device 102 should not be viewed as limited to a tablet computing device or smart phone.

In at least some examples, the computing device 102 includes a display portion or display module having a display. Example types of a display include a light emitting diode (LED) display, quantum dot LED (QLED) display, organic LED (OLED) display, a liquid crystal display, digital light processing display, plasma panel display, rear-projection display, a micro display, similar displays, or combinations thereof. The display can further include various components for rendering a graphical representation which defines a visual arrangement of a set of pixels in response to computer-executable instructions and/or user-input. Examples of a graphical representation can include images, text, animations, emojis, notifications, banners, icons, etc. The depiction of one or more graphical representations at the display can define a user interface, which comprises the composite of graphical representation(s) accessible for viewing and/or user interaction at the display. A user interface can specifically include a graphical user interface, touchscreen graphical user interface, menu-driven interface, command line interface, form-based interface, natural language interface, etc.

In some embodiments, the computing device 102 can maintain electrical connection with a keyboard 108 while attached to the computing device cover 104. The keyboard 108 can include a set of key mechanisms 110 and a trackpad 112. The key mechanisms can include physical buttons pressed by the user to interface with the computing device 102.

In these or other examples, the computing device cover 104 corresponds to the computing device 102. As used herein, the terms "computing device cover," "cover," or "case," refer to an exterior component in removable contact with at least one outer surface of a housing of the computing device 102. A computing device cover 104 can include a removable cover, housing, panel, skin, protector, protective shell, similar enclosure, or combinations thereof that is sized and shaped to receive at least a portion of the outer body or housing of the computing device 102. In some implementations, a computing device cover can help protect or shield a computing device 102 (e.g., from bumps, scratches, drops, etc.). Further, in some implementations, the computing device cover can include electrical circuitry and/or electrical components for at least one of receiving or transmitting electrical signals. In this regard, the disclosed computing device cover can serve as an active medium—as opposed to a passive medium like conventional cases—through which electrical signals can be actively received and/or actively transmitted relative to a computing device or an accessory device.

In some examples, the computing device cover 104 can have a rear portion (or rear surface) configured to overlap and at least partially cover or enclose a rear surface of the computing device 102. In some embodiments, the rear portion of the computing device cover 104 can cover all (or substantially all) of the rear surface of the computing device 102 (e.g., all of the rear surface of the computing device 102 except for an aperture for a camera or another rear-facing sensor). The computing device cover 104 can therefore act as a barrier preventing other objects from contacting and potentially damaging at least the rear surface of the computing device 102. The computing device cover 104 may be removable and reattachable to the computing device 102 without damage to the case or computing device, and the computing device 102 may be operated normally without the computing device cover 104 being attached to it.

In some examples, the computing device cover 104 can include one or more sidewalls. As used herein, the term "sidewall" (in connection with the computing device cover 104) refers to a member that is configured to at least partially cover or overlap with a lateral side of the computing device 102. A combination of sidewalls can be implemented (e.g., to at least partially wrap around each lateral side of the computing device 102)—particularly for various shell-like embodiments disclosed herein. In some embodiments, the lateral sides are positioned surrounding a front face of the computing device 102 through which the display is viewed by the user and extends between the front face and the rear face positioned opposite the front face.

As shown, the computing device cover 104 can include a rotatable portion 106. The "rotatable portion," "support portion," and "kickstand" refer to a portion of a computing device cover that is rotatably positionable relative to the computing device or another section of the computing device cover. In some embodiments, the rotatable portion can provide support for the computing device 102 in multiple viewing positions, such as landscape and portrait positions. The kickstand can also provide multiple viewing angles. For example, the kickstand can be positioned at an angle between 0 degrees and 80 degrees from the computing device. This can enable the user to view the computing device at different angles. These different viewing angles can optimize the computing device position for different activities, such as media consumption or typing input.

The computing device 102 or the cover 104 can also retain an electronic stylus 114. The stylus can be retained by the computing device cover 104 using a myriad of methods including, but not limited to, elastic loops, magnets, adhesives, etc. The computing device cover 104 can be removably attached to the computing device 102 in a variety of ways, including but not limited to, magnets, adhesives, or a retaining portion of the computing device cover 104.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1.

Figure 2:
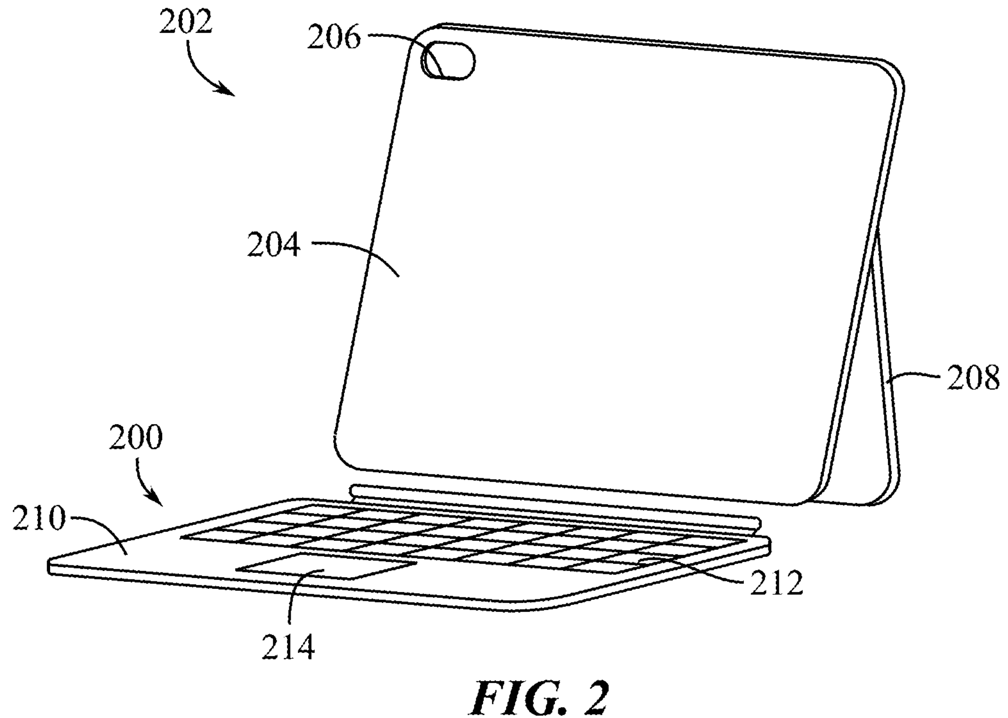
FIG. 2 illustrates an example computing device cover including an upper assembly and a lower assembly.

FIG. 2 illustrates an example computing device cover 202 including an upper assembly (comprising at least a back panel or base layer 204 and a rotatable portion 208 rotatably connected to the back panel) and a lower assembly with an input device 200 in accordance with one or more examples of the present disclosure. As shown, the computing device cover 202 can include a base layer 204. The "base layer," "back panel," and "rigid backing" can be a main portion of a computing device cover or shell that provides structural strength and that are formed as a panel configured to be positioned behind the rear surface of the housing of the computing device 102. Thus, the base layer 204 can abut the rear surface of a computing device, such as the computing device 102 shown in FIG. 1. The base layer can be constructed from a variety of different materials, each with their own properties and advantages. For example, the base layer can allow electrical signals or light to pass though. The base layer can also exhibit different levels of rigidity. Some example materials can include fiberglass, carbon fiber, aluminum, steel, plastic, etc. The base layer can be constructed from multiple different materials by utilizing coatings or layers. For example, the base layer can include a layer that abuts the computing device that can be a soft, directional material such as microfiber to protect the computing device and provide a frictional surface. The base layer can also include another layer attached to the rigid layer, the layer that abuts the computing device, or both. This base layer can comprise a single coat or multiple coats of paint, enamel, or other material. This coating can increase scratch resistance, alter capacitance sensitivity, provide color to the base layer, or change the finish of the base layer.

In some examples, the base layer 204 can include an aperture 206. In some embodiments, the aperture 206 can be sized and shaped to receive a camera enclosure (e.g., a camera "turret" or other camera-surrounding housing component) of a computing device. Additional aspects of the aperture in relation to the camera enclosure are discussed in FIGS. 14-15.

The computing device cover 202 can also include a rotatable portion 208. The rotatable portion 208 can be rotatably positionable relative to the base layer 204 of the computing device cover 202, as mentioned above and discussed further below in relation to subsequent figures.

FIG. 2 also shows a keyboard 210. The keyboard 210 can include input devices such as key mechanisms 212 and a trackpad 214. The keyboard 210, however, can be interchangeable with a variety of input devices. For example, a peripheral input device is connectable to a computing device (e.g., via a docked, wired, or wireless connection). In such examples, an input device can include a standalone keyboard, a number input pad (e.g., "tenkey" pad), a trackpad, a mouse, another pointer input device, an electronic stylus (e.g., a pointer tool or digital writing utensil), a graphic pen tablet, similar devices, and combinations thereof.

In these or other examples, the keyboard 210 can include an electrical connector that can contact, engage, or mate with a corresponding electrical connector of the computing device cover 202 or the computing device itself. It will be appreciated, however, that in some embodiments the keyboard is not attached to the computing device cover 202. Instead, the keyboard 210 can be removed from the computing device cover 202 (and subsequently reattached) as may be desired. As used herein, the term "electrical connector" can include one or more elements for the transmission of data and/or power between components connected to the electrical connector. In some examples, an electrical connector includes at least one of an electrical contact, magnetic contact, pin, port, socket, card reader, male-female connection, switch, or circuitry. Any of the features, components, parts, including the arrangements and configurations thereof shown in FIG. 2 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 2.

Figure 3:
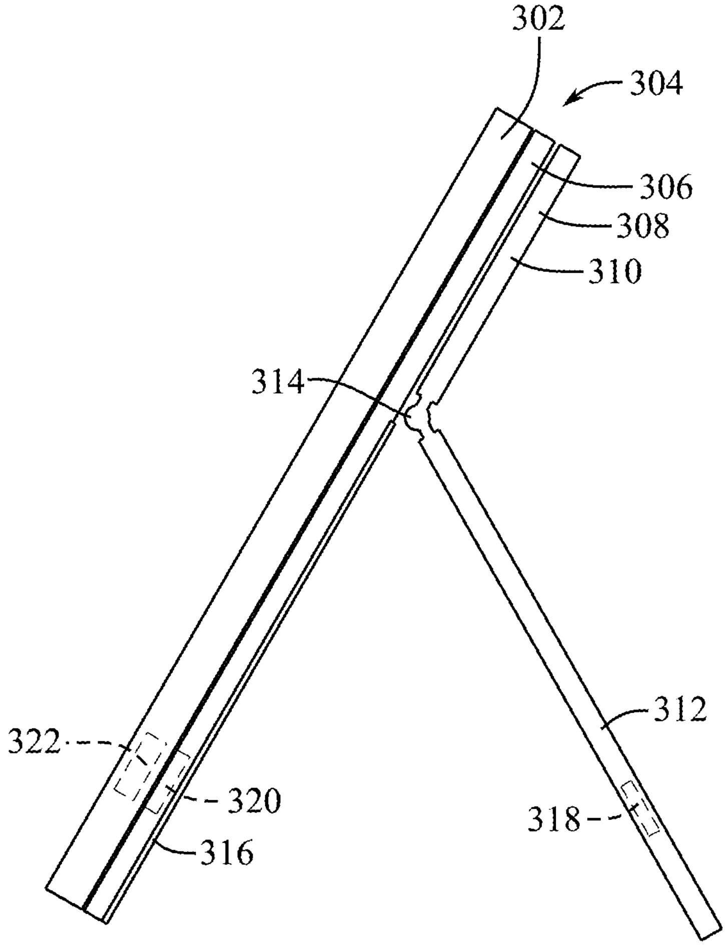
FIG. 3 illustrates a side view of an example computing device cover and an example computing device.

FIG. 3 illustrates a side view of a computing device cover 304 and a computing device 302 in accordance with one or more examples of the present disclosure. The computing device cover 304 can include a base layer 306. In particular embodiments, the base layer 306 can include a painted surface 316. The painted surface can serve as a protective surface for the base layer 306 and provide an aesthetically pleasing experience for the user. The painted surface 316 can be manufactured in a variety of ways, including anodizing, sintering, painting, and other coloring techniques. In some embodiments, the surface 316 can include a touch input surface responsive to user input. As used herein, a "touch input surface" refers to a surface of a touch input device that is capacitance-sensitive and configured to detect a touch or user object at the touch input surface. The touch input surface can detect changes in capacitance due to a user touch, an electronic stylus, or other object. For example, the touch input surface can receive typing input, drawing input, tap input, etc.

In some embodiments, the base layer 306 can abut a computing device 302. In some embodiments, the base layer 306 can include a cover layer (e.g., 402 in FIG. 4) contacting the computing device 302 and a rigid panel (e.g., 404) positioned within the cover layer. The computing device cover 304 can be attached to the computing device 302 using various methods. For example, the computing device cover 304 can include magnets 318, 320 designed to interact with one or more magnets 322 of the computing device 302 to secure the computing device cover to the computing device. The magnetic forces created by the magnets 320, 322 can counteract substantially vertical gravitational forces acting on the computing device 302 when the computing device 302 is being supported in an upright orientation (e.g., as shown in FIG. 3). Other methods of attachment can include a snap-fit, a removable adhesive, removable fasteners, interlocking members, hook-and-loop fasteners, etc. Each of these methods of attachment can exert forces on the computing device 302 to counteract gravitational forces.

In some embodiments, the computing device cover 304 can also include a split layer 308 attached to the base layer 306. As used herein, the terms "split layer" and "hinged layer" refer to a layer of a computing device cover or shell that has at least two portions connected by a section that allows rotational displacement between the sections relative to one another. The split layer 308 can include a fixed portion 310 (which may be an upper portion) attached to the base layer 306. Various modes of attachment between the base layer 306 and fixed portion 310 are possible, including, but not limited, to adhesives, fasteners, and similar attachment methods. The adhesive used to attach the split layer 308 to the base layer 306 can vary in thickness, chemical composition, durability, color, etc.

The split layer 308 can further include a rotatable portion 312. In some examples, the rotatable portion 312 can be pivotably connected to the fixed portion via a rotation member 314. The rotation member may be a connection member and may function as a hinge. The rotation member can include a compliant mechanism (e.g., a flexible material positioned in the split layer 308), a mechanical hinge component (e.g., a barrel hinge), or another kind of component that allows rotation about a point or axis. In some embodiments, the base layer 306 and the rotatable portion 312 can include a set of magnets 318, 320. The magnets 318, 320 may be aligned and capable of holding the rotatable portion 312 against the base layer 306 when they are near each other. Additional functionalities of these magnets, for some embodiments, are further discussed in FIG. 4. In these or other examples, the edges of the split layer 308 and the base layer 306 can form a uniform outer edge such that the one layer does not overhang the other layer. This creates a smoother outer surface and aesthetically pleasing profile. Thus, the outer edges of the layers 306, 308 may be aligned in a front-to-back direction. In some arrangements, the outer edges of the layers 306, 308 are aligned with the outer edges of the computing device 302.

Any of the features, components, parts, including the arrangements and configurations thereof shown in FIG. 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 3.

Figure 4:
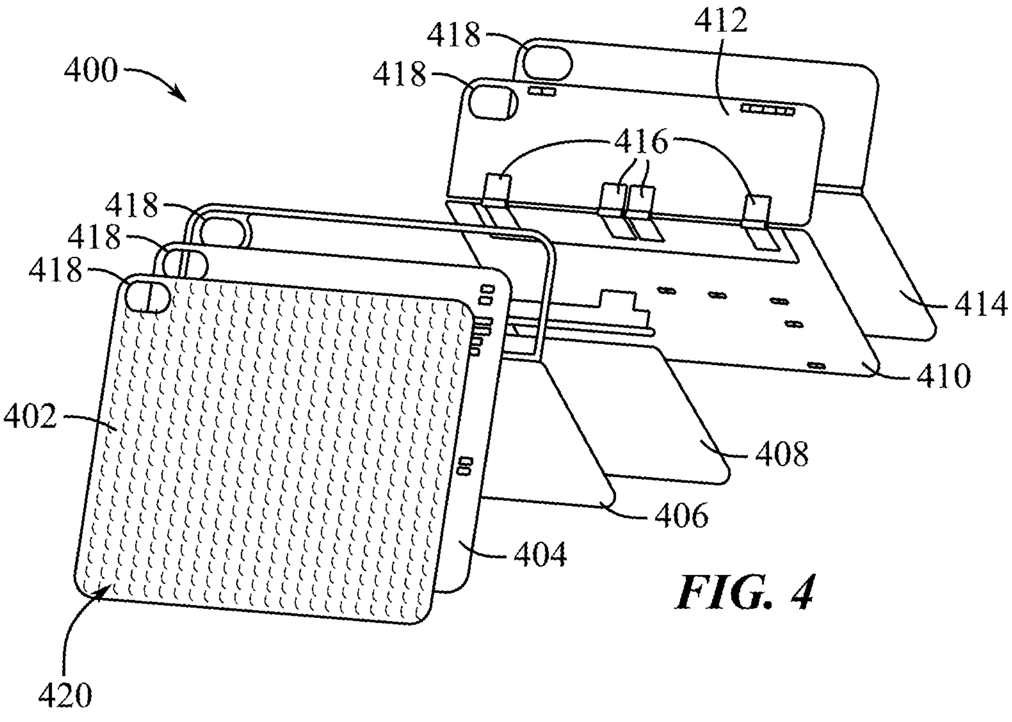
FIG. 4 illustrates an exploded view of various layers of a computing device cover.

FIG. 4 illustrates an exploded view of various layers of a computing device cover 400 in accordance with one or more examples of the present disclosure. In some embodiments, the computing device cover 400 can include a first layer 402 such as a cover layer configured to abut a computing device. The first layer 402 can be manufactured from a variety of materials, such as a fabric material (e.g., microfiber) or an elastomeric material. In some embodiments, the first layer 402 can include a directionally biased friction material 420. In particular implementations, the directionally biased friction material 420 includes a nap (e.g., including directional fibers extending from a base material of the first layer 402) oriented to frictionally oppose gravitational pull of the computing device when a computing device is in face-to-face contact with and attached to the computing device cover 400. Gravitational forces acting on the computing device when the computing device is attached to the computing device cover 400 can lead to slippage, displacement, or other undesirable effects. The nap of the first layer 402 can counteract gravitational or other forces by providing a frictional force to support the computing device. For example, when the computing device and cover 400 are in a landscape orientation (e.g., with an elongated dimension oriented horizontally relative to a shorter dimension oriented vertically, as shown in FIG. 4), the nap can be directed upward along the front-most surface of the first layer 402 (e.g., substantially opposite the downward gravitational direction) to counteract gravitational forces on the computing device. The first layer or cushioned surface can be a layer of material that directly abuts the computing device. The magnets of the cover 400 can be used for retention, for conveying positional information of the computing device or cover components via a set of sensors, or for other purposes. The strength of the magnetic force exerted on the computing device by the magnets in the computing device cover can vary relative to the distance between the computing device and the computing device cover 400. This distance can be controlled by the thickness of the first layer 402. Thus, the thickness of the first layer 402 can be adjusted to facilitate a desired magnetic force on the computing device. In some embodiments, this distance can also be controlled via the nap of the first layer 402. For example, the nap of the first layer 402 may have fibers oriented at an angle (relative to the major plane of the first layer 402 behind the fibers) to decrease the distance between the computing device and the magnets in the cover 400. Alternatively, the fibers may be oriented substantially perpendicular to the major plane of the first layer 402 to maximize distance between the computing device and magnets in the cover 400.

In some embodiments, the computing device cover 400 can also include a base layer 404. The base layer 404 can be made of a variety of materials, including but not limited to rigid materials such as fiberglass, metals, ceramics, etc. The base layer 404 can be configured to exhibit a specific rigidity, providing a desired feel, aesthetic, or function. The base layer 404 may be referred to as a rigid layer or rigid panel portion of the cover 400. In some embodiments, the base layer 404 may support magnets, similar to magnets 320.

The computing device cover 400 can also include a fabric layer 406. As shown in FIG. 4, the fabric layer 406 can have an opening in the upper portion to save weight and decrease the total thickness of the computing device cover. The lower portion of the fabric layer 406 can be attached to a front side of the rotatable portion 410. The fabric layer 406 can abut the base layer 404 in the stowed position, and can be exposed and spaced away from the base layer 404 in the deployed position. In some embodiments, the upper portion of the fabric layer 406 can be in constant contact with the base layer 404, while the lower portion can contact the base layer 404 in a closed position and rotate away from the base layer 404 in other positions. As discussed more below, the fabric layer 406 can also conceal certain structural components-lending to a more aesthetically pleasing and uniform design and surface finish.

In some embodiments, the computing device cover 400 can also include a cap 408. The cap 408 can be attached to the fabric layer 406, a rotatable portion 410, both, or neither. In some examples, the cap 408 can provided increased stiffness or other material properties to the computing device cover 400, specifically the rotatable portion 410 discussed below. In particular implementations, the cap 408 can help visually conceal certain portions of the rotation members 416.

The computing device cover 400 can also include a split layer comprised of a fixed portion 412 and a rotatable portion 410. The split layer can also include one or more rotation members 416. The rotatable portion 410 can be attached to the fixed portion via the rotation members 416. The rotation members 416 allow the rotatable portion 410 to pivot about an axis defined by the one or more rotation members relative to the fixed portion 412. The computing device cover 400 can also include an outer layer 414 or a rear layer. The outer layer 414 can be manufactured from a variety of materials, including fabrics and elastic sheet material. In some embodiments, the computing device cover 400 can include at least one aperture 418 sized and shaped to receive a camera turret or other rearward-protruding portion of the computing device. The aperture 418 can extend through one or more layers of the computing device cover 400. The layers of the computing device cover 400 can be attached by thermoforming, adhesives, co-molding, other types of attachment mechanisms, or combinations thereof.

Any of the features, components, parts, including the arrangements and configurations thereof shown in FIG. 4 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 4.

Figure 5:
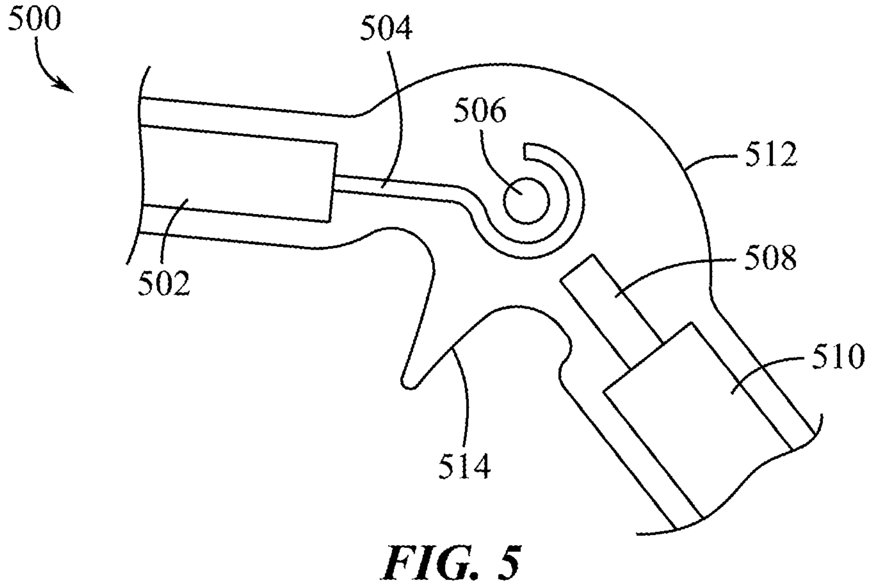
FIG. 5 illustrates a cross-section of an example hinge portion of a computing device cover.

FIG. 5 illustrates a cross-section of an example hinge portion 500 of a computing device cover in accordance with one or more examples of the present disclosure. The hinge portion 500 may be positioned along the hinge between portions 410 and 412 of cover 400, such as at one of the rotation members 416. In some embodiments, the hinge portion 500 can include a fixed portion 502 attached to the base layer (such as the base layer 404 in FIG. 4). The fixed portion 502 can also include a retention member 504 (e.g., a barrel) that encompasses a rod 506 (e.g., a pin extending through the barrel). The retention member 504 and the rod 506 engage and allow pivoting rotational motion of the retention member 504 about the rod 506. The rod 506 can be detached from any layer of the computing device cover, and can serve to align multiple components of the hinge portion 500 with each other. The first end 508 of the rotatable portion 510 may also form a barrel that extends around the rod 506 and may be rotatable in a manner similar to retention member 504. Thus, the hinge portion 500 may form a barrel hinge similar to hinges used in door frames.

Together, the retention member 504, rod 506, and first end 508 can form a friction hinge having a predetermined amount of friction between the retention member 504 or first end 508 and the rod 506. In some examples, the friction hinge can help provide certain kinematics or feel of use. For instance, the friction hinge can help maintain a position of a rotatable portion 510 (e.g., a kickstand) once placed in a desired position. In other words, the friction hinge can help mitigate or reduce bounce-back, creep, or other undesired movement of rotatable portion 510. The hinge may maintain position when rotated to a desired deployed position even when supporting the weight of a computing device.

The hinge portion can 500 can also include rotatable portion 510 (also referred to as a rotation member or kickstand). In some embodiments, a first end 508 of the rotatable portion 510 can pivot around or otherwise engage (e.g., contact, attach to) the friction hinge, as discussed above.

In some embodiments, the hinge portion 500 can include a cover layer 512 and an outer layer 514. In at least one embodiment, the cover layer 512 and the outer layer 514 can be manufactured from sheets of fabric. The cover layer 512 and the outer layer 514 can be attached to both the fixed portion 502 and the rotatable portion 510 via an adhesive. The cover layer 512 can be pre-drawn to increase or decrease the elastic force acting on the hinge portion 500. As used herein, the term "pre-drawn fabric" refers to a material that has been stretched or drawn taught in certain portions (or in certain positions) and compressed or slackened in other portions (or positions) during assembly to induce specific elastic forces or physical properties at specific angles of a rotatable portion relative to a friction hinge. For example, pre-drawn fabric can include stretchable material tensioned based on desired kinematics, hinge angle positioning, and/or hinge displacement. Specifically, the pre-drawn fabric can control the kinematics of the rotatable portion 510, where kinematics can include range of motion, ease or difficulty of motion, stiffness, rotational velocity, acceleration (e.g., amount of pop away from or draw towards a reference plane), rotational impedance or friction, bounceback, creep, positional anchorability (e.g., to remain at a certain hinge angle), etc. In this manner, pre-drawn fabric can include material designed to include a particular amount of tension for at least one angle of the rotatable portion 510. Additionally or alternatively, in certain cases, the pre-drawn fabric can include material designed to include differing amounts of tension for angles (or angle ranges) that coincide with various positions within a range of motion for the rotatable portion 510 (e.g., a first tension amount for a first range of angles, a second tension amount for a second range of angles, and so forth).

The outer layer 514 can also be pre-drawn to increase or decrease the elastic force acting on the hinge portion 500. This can be designed to affect the dynamics of the rotatable portion 510. For instance, a compressed fabric portion can be induced when the rotatable portion 510 is positioned at a certain angle—thereby helping to provide a rotational bias that pushes the rotatable portion 510 away from a given plane or surface (e.g., the fixed portion 502 or the back panel (e.g., 404). As another example, a stretched fabric portion can be induced when the rotatable portion 510 is positioned at another angle—thereby helping to provide a rotational bias that pulls the rotatable portion 510 towards a given plane or surface (e.g., the fixed portion 502 or the back panel).

In some embodiments, the fixed portion 502, the retention member 504, the rod 506, the rotatable portion 510, and the thin section of the rotatable portion 510 (e.g., the first end 508) can be hidden by the cover layer 512 and the outer layer 514 such that they are covered and therefore imperceptible to the unaided eye. The outer layer 514 can be constructed such that the outer layer 514 lacks any wrinkles, creases, surface aberrations, etc. This adds to the aesthetic properties of the hinge portion 500, creating a sleek and streamlined look. As used herein, an "unaided human eye" is a naked eye of an average human observer having regular vision and that is not augmented or supplemented by lenses, microscopes, cameras, or other scopes or equipment used to discern wavelengths beyond the natural human eye. In some embodiments, any wrinkles or creases in the outer layer 514 or cover layer 512 may be consistent across the internal hinge components in a manner that prevents the unaided human eye from detecting where the internal hinge components interface with each other. For example the outer and cover layers can have a consistent appearance longitudinally along the hinge portion 500, on both sides of the hinge portion 500. The positions, width, interface, and/or diameter of the retention member 504 and first end 508 are not visible to an unaided human eye.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5. For example, the hinge portion 500 of FIG. 5 can include one or more stiffeners, discussed below in relation to FIGS. 6-9.

Figure 6:
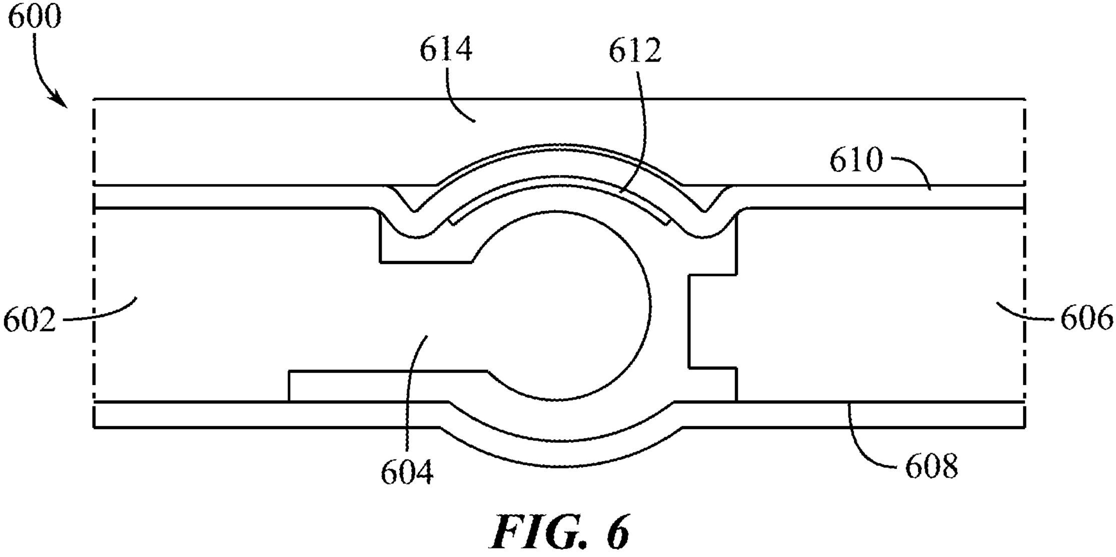
FIG. 6 illustrates another cross-section of an example hinge portion of a computing device, including a floating hinge cap.

FIG. 6 illustrates another cross-section of an example hinge portion 600 of a computing device, including a floating hinge cap 612 in accordance with one or more examples of the present disclosure. The hinge portion 600 can include a fixed portion 602 with a flagpole 604. The hinge portion 600 can also include a rotatable portion 606. Like a ball-and-socket joint, the ball end of the flagpole 604 comprises the rotational axis (extending out of the page) about which the rotatable portion 606 rotates. The hinge portion 600 can also include a cover layer 610 and an outer layer 608. At least a portion of the cover layer 610 can be attached to the base layer 614 (e.g., the portion abutting the fixed portion 602). At least another portion of the cover layer 610 can abut or adhere to the base layer 614 (e.g., where sandwiched between the base layer 614 and the fixed portion 602). A portion of the cover layer 610 adhered to the rotatable portion 606 can also contact the base layer 614 when the rotatable portion 606 is positioned parallel to the fixed portion 602 (as shown in FIG. 6).

In at least one embodiment, the cover layer 610 and the outer layer 608 can be manufactured from one or more sheets of fabric. The cover layer 610 and the outer layer 608 can be attached to both the fixed portion 602 and the rotatable portion 606 via an adhesive. The cover layer 610 can be pre-drawn to increase or decrease the elastic force acting on the hinge portion 600. The outer layer 608 can also be pre-drawn to increase or decrease the elastic force acting on the hinge portion 600. This can be designed to affect the dynamics of the rotatable portion 606.

In some embodiments, the hinge portion 600 can include a floating cap 612. As used herein, the term "floating cap" refers to a stiffener that is not attached to another portion of the computing device cover, but is retained by or housed within the computing device cover. The floating cap 612 can be positioned in between the flagpole 604 and the cover layer 610. The floating cap 612 can be made from a rigid (or semi-rigid) plastic, metal, ceramic, or composite and can help keep the cover layer 608 from folding or wrinkling (thereby exposing the underlying structure). The floating cap 612 can also be retained within the gap between the fixed portion 602 and the rotatable portion 606 by the pre-drawn nature of the cover layer 610. The floating cap 612 can also serve as a buffer between the flagpole 604 and the cover layer 610, extending the life and usability of the computing device cover.

Any of the features, components, parts, including the arrangements and configurations thereof shown in FIG. 6 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 6.

Figure 7:
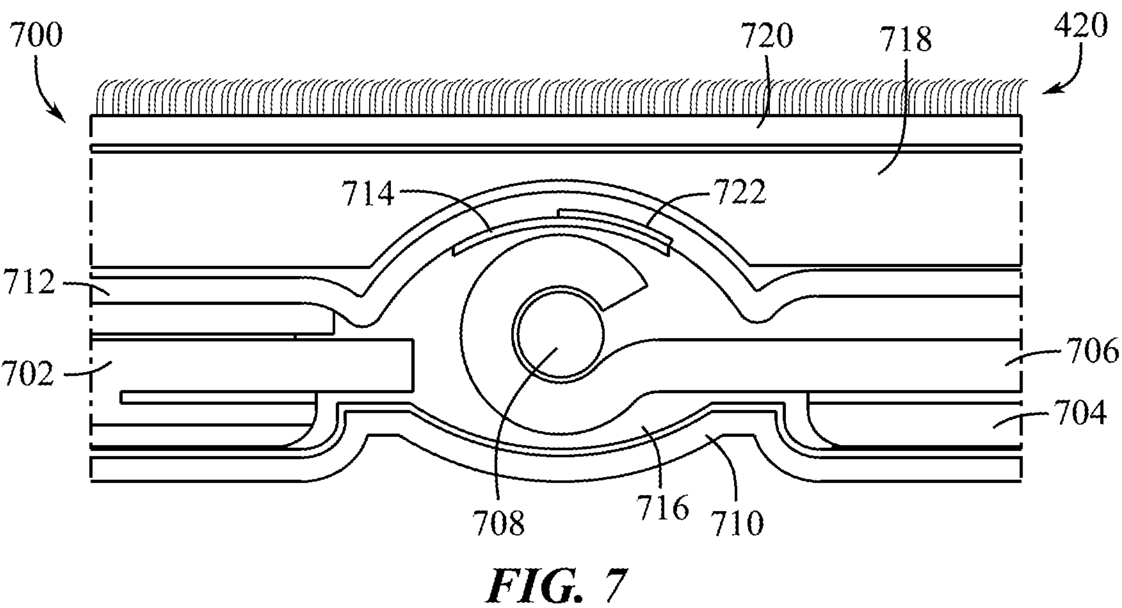
FIG. 7 illustrates yet another cross-section of an example hinge portion of a computing device, including an adhesive under-hinge cap.

FIG. 7 illustrates yet another cross-section of an example hinge portion 700 of a computing device, including an adhesive under-hinge cap 714 in accordance with one or more examples of the present disclosure. The hinge portion 700 can include the same or similar elements described above in relation to FIGS. 5-6. For example, the hinge portion 700 can include a fixed portion 704, a rotatable portion 702, a retention member 706, a rod 708, a cover layer 712, an outer layer 710, a base layer 718, and a cap 714. Differently, however, FIG. 7 illustrates a reinforcement 716, a first surface 720, and an adhesive portion 722. The outer layer 710 can include reinforcement 716 to provide rigidity, strength, and further control the dynamics of the hinge portion 700. For example, fabric used to manufacture the outer layer 710 may be too pliable to facilitate the desired dynamics of the system when pre-drawn. To compensate, the reinforcement 716 (e.g., an adhesive layer) can be applied to increase the rigidity of the outer layer 710, changing the dynamics of the rotational member 700. The reinforcement 716 can also keep the outer layer 710 from wrinkling, stretching, or tearing, therefore creating a more robust and aesthetically pleasing user experience. The cover layer 712 can also be made of fabric, and can be pre-drawn to affect the dynamics of the rotational member 700. One side of the cover layer 712 can be attached to a base layer 718 via an adhesive, thermoforming, or other process not specified herein. The base layer 718 can be attached to a first surface 720, which can abut the computing device. Another side of the cover layer 712 can be attached to the rotatable portion 702 via an adhesive, thermoforming, or other process not specified herein.

The rotational member 700 can also include a cap 714. The cap 714 can either be a floating cap as described in FIG. 6, or be attached to the cover layer 712. The cover layer 712 can serve to protect the rotatable portion 702, retention member 706, fixed portion 704, rod 708, and floating cap 714 from damage, as well as making the rotational member imperceptible to the unaided human eye. The cap 714 can keep the retention member 706 and the rod 708 from protruding against the cover layer 712, which would detract from the aesthetics of the computing device cover. The hinge portion 700 can also include an adhesive portion 722, which can be adjusted to allow more or less stretch in the cover layer 712 without compromising aesthetics. For example, if the adhesive portion 722 is shorter, the cover layer 712 can stretch more. However, a longer adhesive portion 722 can limit the distance that the cover layer 712 can stretch. This variable stretch length of the cover layer 712 can reduce wrinkling and premature tearing of the cover layer 712.

FIG. 7 further illustrates the first surface 720 comprising the directionally biased friction material 420 discussed above. As shown, the directionally biased friction material 420 comprises directionally oriented or aligned fibers (e.g., nap with an upwards curl or slant) to help resist movement of a computing device when placed against the first surface 720. In some examples, the directionally biased friction material 420 can resist the sliding motion in a particular direction of an abutting computing device (e.g., in an approximately downward direction, gravity based direction, or other suitable direction). For instance, the directionally biased friction material 420 can push upwards against the abutting computing device surface to frictionally oppose a sliding motion or otherwise impart an upward bias against the abutting computing device.

In at least one example, the directionally biased friction material 420 can resist sliding motion of an abutting computing device in multiple directions (e.g., in a first downward direction when the disclosed computing device cover is oriented in a landscape orientation and in a second downward direction when the disclosed computing device cover is oriented in a portrait orientation). In such a case, the directionally biased friction material 420 can include a first set of fibers oriented in a first direction and a second set of fibers oriented in a second direction, where the first and second sets of fibers comprise an orientation offset of approximately 90 degrees. In other examples the first and second sets of fibers can include other orientation offsets (e.g., between 45 degrees and 90 degrees, between 70 degrees and 120 degrees, between 100 degrees and 150 degrees, or between 140 degrees and 190 degrees, as may be desired). Thus, it will be appreciated that the first surface 720 can include additional or alternative orientations of the directionally biased friction material 420 than presently illustrated in FIG. 7.

Any of the features, components, parts, including the arrangements and configurations thereof shown in FIG. 7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 7.

Figure 8:
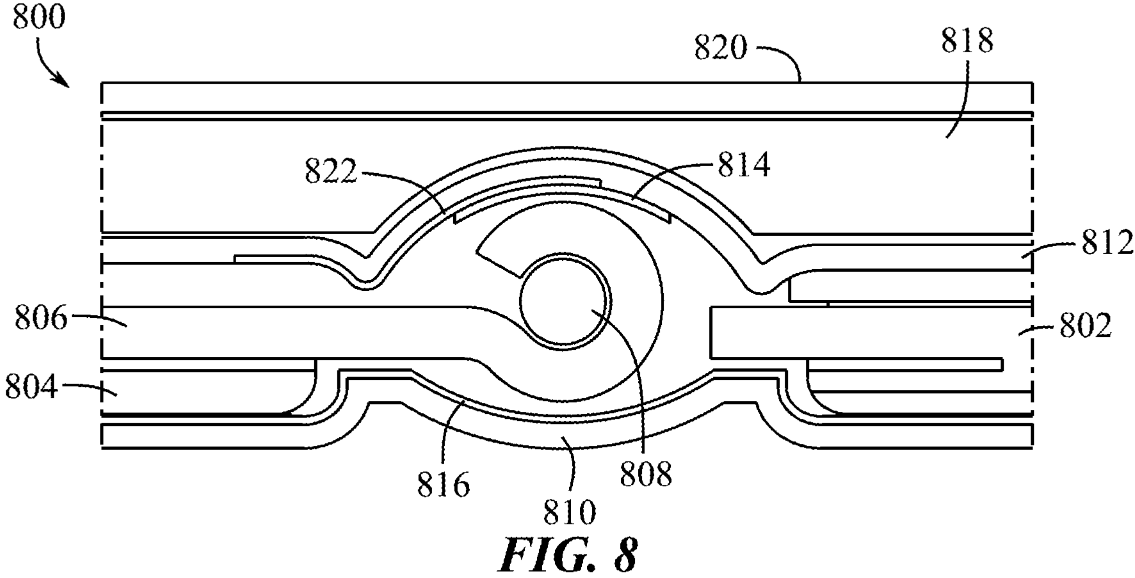
FIG. 8 illustrates another example cross-section of a hinge portion of a computing device, including an under-hinge cap.

FIG. 8 illustrates another example cross-section of a hinge portion 800 of a computing device, including an under-hinge cap 814 in accordance with one or more examples of the present disclosure. The hinge portion 800 exhibits the same or similar characteristics and components as the rotational member 700 shown in FIG. 7. For example, the hinge portion 800 can include a fixed portion 804, a rotatable portion 802, a retention member 806, a rod 808, a cover layer 812, an outer layer 810, a base layer 818, a first surface 820, a reinforcement 816, and a cap 714. Differently, however, the adhesive portion 822 can extend past the cap 814, along the cover layer 812, and to the pre-drawn section of the cover layer 812. The cover layer can be strengthened by bonding the adhesive portion 822 to the interstitial fabric of the cover layer 812. In some examples, extending the adhesive along the cover layer 812 can further protect the hinge portion 800 from surface aberrations, deformation, wrinkling, and premature tearing.

Any of the features, components, parts, including the arrangements and configurations thereof shown in FIG. 8 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 8.

Figure 9:
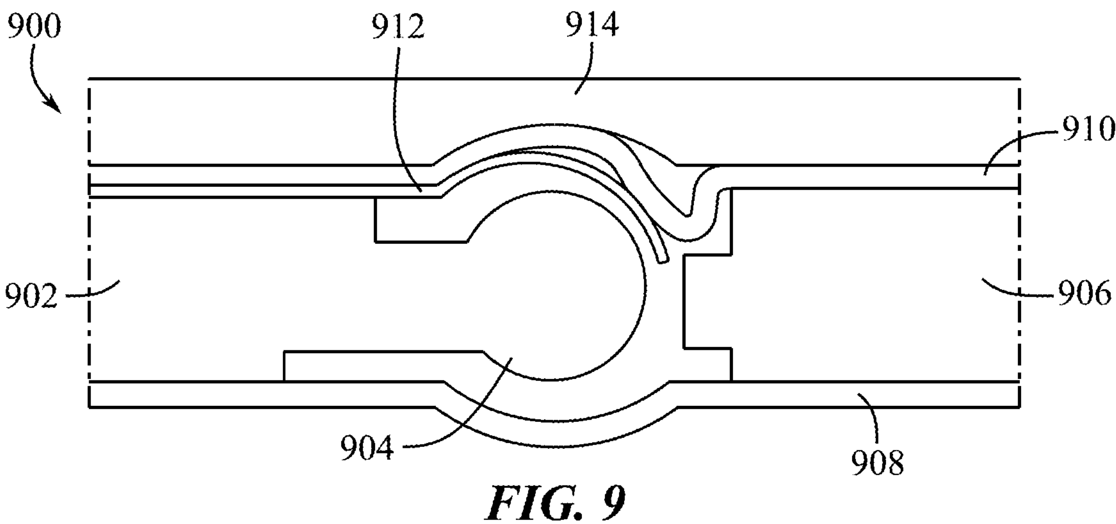
FIG. 9 illustrates another cross-section of an example hinge portion of a computing device, including a fixed hinge cap.

FIG. 9 illustrates another cross-section of an example hinge portion 900 of a computing device, including a fixed hinge cap 912 in accordance with one or more examples of the present disclosure. The hinge portion 900 can include the same or similar elements described above in relation to FIG. 6. For example, the hinge portion 900 can include a fixed portion 902, a rotatable portion 906, a flagpole 604, a cover layer 910, an outer layer 908, and a base layer 914.

Differently, however, FIG. 9 illustrates a fixed cap 912. The fixed cap 912 can be attached to the fixed portion 902 via a myriad of methods. The fixed cap 912 can extend past and cover the flagpole 904. The fixed cap 912 can be made from plastic, metal, ceramic, or composite and can keep the cover layer 908 from folding, wrinkling, or tearing prematurely. The fixed cap 912 can also serve as a buffer between the flagpole 904 and the cover layer 910, thereby helping to extend the life and usability of the computing device cover. In the embodiment shown, the cover layer 910 is pre-drawn on one side of the fixed cap 912 to accommodate the attachment of the fixed cap 912 to the cover layer 910.

Any of the features, components, parts, including the arrangements and configurations thereof shown in FIG. 9 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 9.

Figure 10:
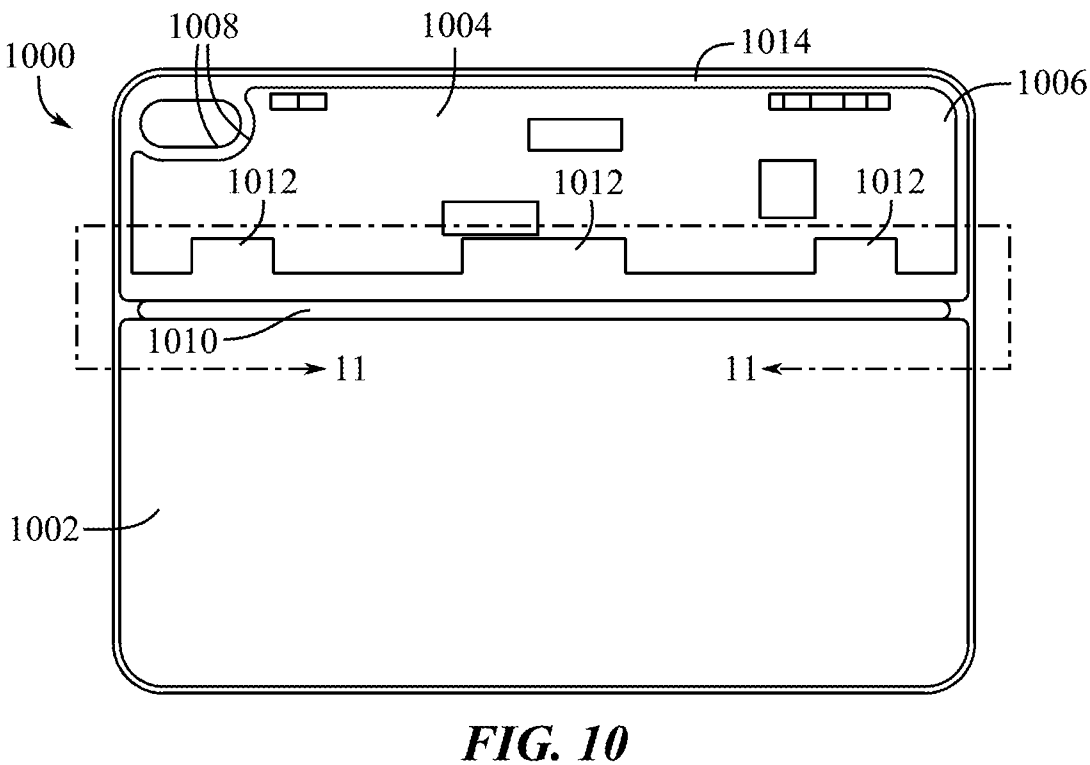
FIG. 10 illustrates a top view of an example hinged layer comprising a fabric layer attached to an upper and lower panel of a computing device cover.

FIG. 10 illustrates a front view of an example hinged layer 1000 comprising a fabric layer attached to an upper and lower panel of a split layer (e.g., similar to components 406, 408, and 410 of FIG. 4) in accordance with one or more examples of the present disclosure. The hinged layer 1000 can include a fabric layer 1002 attached to the upper base layer 1004 (e.g., upper and lower panels, as shown in the exploded view of FIG. 4).

The fabric layer 1002 can include an upper fixed portion 1014 in which an opening 1006 is formed. Inclusion of an opening 1006 in the fabric layer 1002 can save material, decrease the weight of the computing device cover, and decrease the thickness of the computing device cover.

In some embodiments, the base layer 1004 and the fabric layer 1002 can both include at least one cutout (as indicated by cutouts 1008 in FIG. 109) sized and shaped to receive a camera enclosure or other rearward-protruding portion of the computing device. As shown, the fabric layer 1002 can extend across the axis of rotation of at least one rotation member 1010 to allow the rotatable portion hingedly connected to the base layer 1004 to be deployed.

The fabric layer 1002 can also include one or more tabs (e.g., fabric extensions 1012) to increase the strength of the attachment between the fabric layer 1002 and the base layer 1004. The fabric layer 1002 can be attached to the base layer 1004 with an adhesive, a thermoforming process, by another similar attachment method, or combinations thereof. In some embodiments, the fabric layer 1002 can include a tension controlled region defined by one or more stiffened areas and one or more flexible areas. As used herein, the term "tension control region" refers to a portion of the computing device cover wherein the material provides a tensile force, contributing to the kinematics of the rotation member. For example, a portion of a tension control region with more tension can make the rotational displacement of the rotational member stiffer; whereas a portion of a tension control region with less tension can allow the rotation member to be displaced more easily. In these or other examples, stiffened areas can be implemented around hinges, and flexible areas can be implemented between hinges. The tension control region with a combination of stiffened areas and flexible areas can govern the kinematics to produce an improved user experience.

As used herein, the term "stiffened area" refers to a portion of the computing device cover that has been modified or constructed to be more rigid than another area such as, for example a flexible area or flexible portion. Relatedly, as used herein, the term "flexible portion" or "flexible area" refers to a portion of the computing device cover that provides comparatively (relative to a stiffened area) less resistance to the rotational displacement of the rotational member. Both the stiffened area and the flexible portion can give the tension controlled region the desired kinematic qualities or tactile feedback. The tension control region can be positioned around the rotation member 1010, thereby affecting the kinematics or tactile feedback of the rotation member 1010.

To illustrate some example effects, the tension control region can include the stiffened areas (e.g., around the hinge components) to promote a tactile feeling of rigidity, stiffness, synchronous movement, component uniformity, etc. when interacting with the kickstand. The stiffened area(s) of the tension control region can also (along with the hinge components themselves) mitigate or reduce bounce-back, creep, or other undesired movement of the kickstand. Similarly, the stiffened area(s) of the tension control region can bias the kickstand towards and/or away from a closed position against the back panel (e.g., such that the kickstand pops or accelerates away from the back panel when initially opening the kickstand). By contrast, the flexible area(s) of the tension controlled region can impart tactile feedback that includes responsiveness, smoothness or ease of rotation, increased range of kickstand rotation, etc. Likewise, the flexible area(s) of the tension controlled region can be stretched to kinematically slow kickstand rotation at certain hinge angles, impart a return bias to a particular hinge angle, etc.

The tension control region can include elongated fabric extensions 1012 (e.g., as part of one or more stiffened areas. Elongated fabric extensions can be longer pieces of fabric used to secure one layer of the computing device cover to another layer thereof. For example, the elongated fabric extensions 1012 can be fabric tabs of the fabric layer 1002 that attach to the base layer 1004. In some embodiments, the elongated fabric extensions 1012 can be adjacent to or overlaying hinges included in the rotation member 1010. The elongated fabric extensions can provide increased localized support for the rotation member 1010. In some embodiments, the elongated fabric extensions 1012 can be interspaced by fabric cutouts. The fabric cutouts can provide increased flexibility to the hinged layer 1000 without sacrificing the strength of the attachment of the hinged layer 1000 to the base layer 1004. In some embodiments, at least a portion of the tension control region can be concealed by the hinged layer 1000 and the base layer 1004. In particular embodiments, the tension control region can include sections of fabric stiffened with adhesive.

Any of the features, components, parts, including the arrangements and configurations thereof shown in FIG. 10 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 10.

Figure 11:
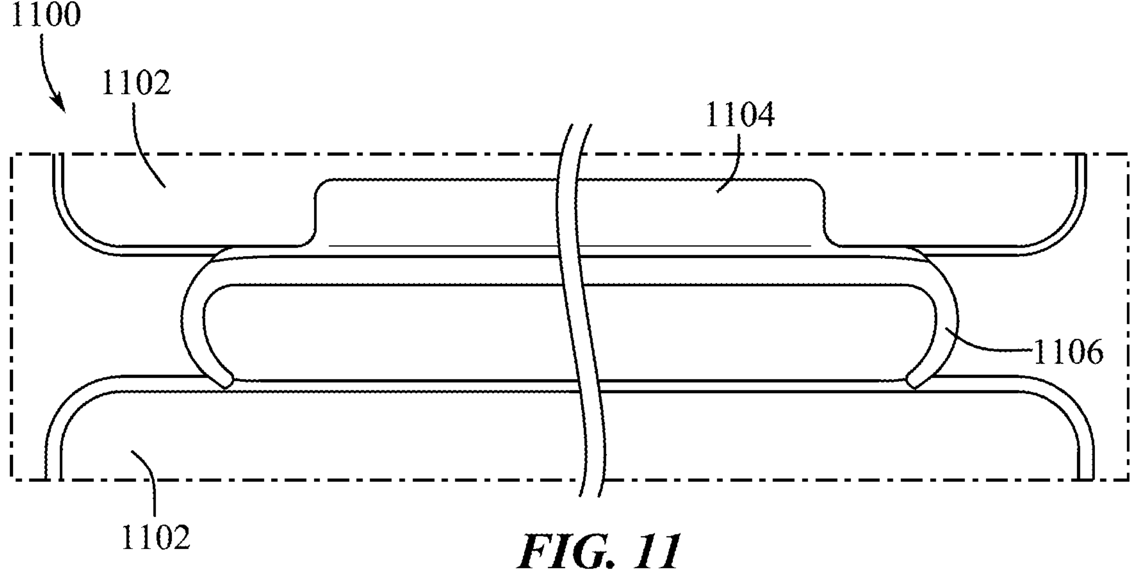
FIG. 11 illustrates a hinged portion of a computing device cover.

FIG. 11 illustrates a close-up view of a hinged portion 1100 of a device cover (e.g., as depicted by the lines 11-11 in FIG. 10) according to an alternative configuration. FIG. 11 illustrates the hinged portion 1100 of a computing device cover in accordance with one or more examples of the present disclosure.

In some embodiments, the fabric layer 1102 can be attached to a base layer. The fabric layer 1102 can also cover one or more rotation members positioned in between the fabric layer 1102 and the base layer, such as the internal components of FIGS. 5-9. As shown, the fabric layer 1102 can include a cutback portion 1104. The cutback portion 1104 can include portions where the fabric layer 1102 is cutaway, thinned, frayed, or removed. The cutback portion 1104 can provide enhanced flexibility, similar to the flexible area(s) discussed above in relation to a tension controlled region. In some embodiments, the cutback portion 1104 can be hidden from the view of the user, such as by being placed between layers 404 and 412 of FIG. 4. In so doing, the cutback portion 1104 can be used to induce a predetermined failure point along the fabric layer 1102 that is also hidden from a user's normal usage perspective. The predetermined failure point can be positioned along the fabric layer 1102 at or near the border of the cutback portion 1104. In some examples, the predetermined failure point can include a concealed tearable area (discussed below) in the fabric layer 1102 that specifically begins at one or more edges of the cutback portion 1104.

As the computing device cover undergoes thousands and thousands of cycles, tearing can occur at the predetermined point of failure at the cutback portion 1104 rather than being in a position more visible and accessible to the user. By facilitating a failure point at (or near) the cutback portion 1104, the tear, surface aberration, or other failure mode is hidden from the view of the user. This failure point created by the cutback portion 1104 can be termed a concealed tearable area. The concealed tearable area can be a predetermined point of tearing failure for the fabric of the hinge and device cover. For example, a concealed tearable area can include a portion of the computing device cover that can fail (e.g., rip, tear, plastically deform, etc.) before other portions of the cover and is concealed from the view of the user. This can extend the usable life of the computing device cover by maintaining an aesthetically pleasing appearance and experience for the user.

Any of the features, components, parts, including the arrangements and configurations thereof shown in FIG. 11 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 11.

Figure 12:
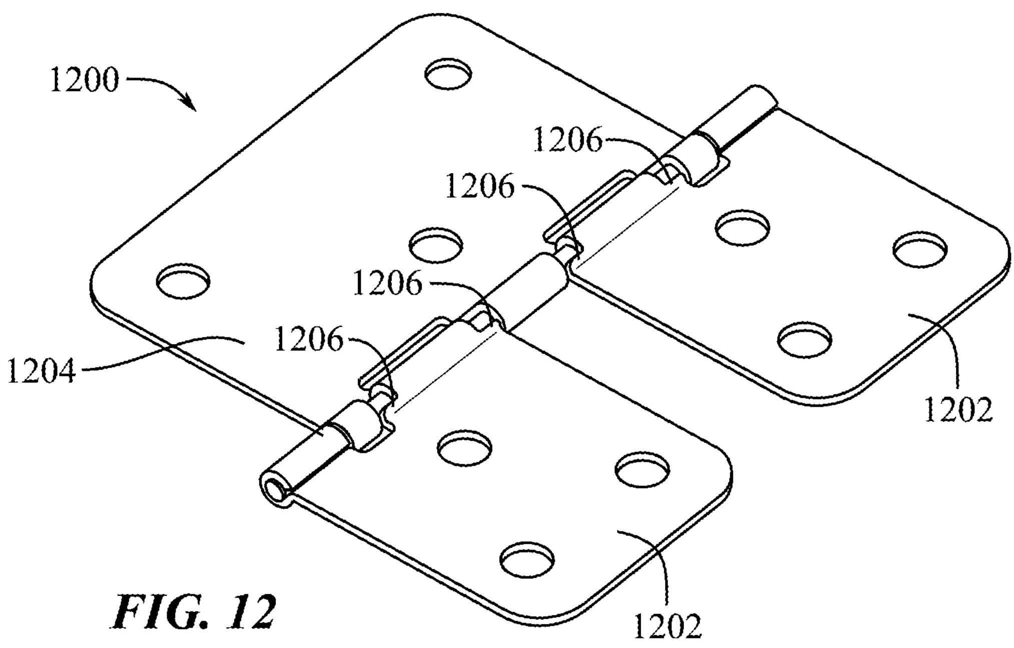
FIG. 12 illustrates an example hinge for a computing device cover.

FIG. 12 illustrates an example hinge mechanism 1200 for a computing device cover in accordance with one or more examples of the present disclosure. The hinge mechanism 1200 can include one or more rigid plates 1202, 1204 that attach to each other to form a rotatable hinge, such as the hinge described in connection with FIG. 5. The hinge mechanism 1200 can therefore form a barrel hinge or similar pivotable linkage, in the manner described in FIG. 5. In some embodiments, the rigid plate 1204 can attach to the fixed portion of a split layer, and the rigid plates 1202 can attach to the rotatable portion of the split layer, or vice versa.

The hinge mechanism 1200 can limit the range of rotational motion of the rigid plates 1202 with the inclusion of one or more hardstops 1206 formed on the rigid plates 1202 (and in some embodiments, plate(s) 1204). The hardstops physically prevent further rotational displacement of the hinge mechanism 1200 past a predetermined angular displacement limit. In some embodiments, the inclusion of hardstops 1206 can restrict the rotatable portion of the computing device cover from overextending and causing damage. In particular embodiments, the hardstops 1206 can limit the rotatable portion to a specific degree or set of degrees, such as about 85 degrees relative to a specific reference plane or angle reference (e.g., the back panel or a zero degree angle of the hinge where the rotatable portion is closed shut against the back panel). In some embodiments, the hardstops 1206 can provide increased support or a feeling of strength/rigidity when the rotatable portion rotates such that the hardstops 1206 are engaged.

Any of the features, components, parts, including the arrangements and configurations thereof shown in FIG. 12 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 12.

Figure 13:
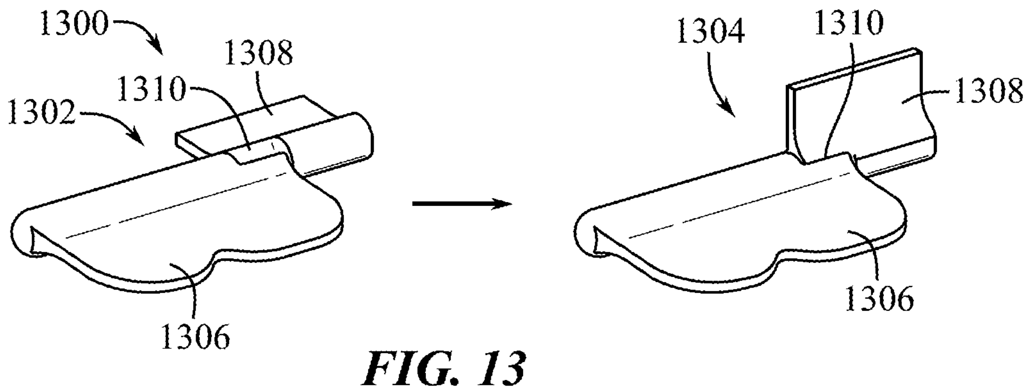
FIG. 13 illustrates an example hardstop mechanism for a hinge of a computing device cover.

FIG. 13 illustrates an example hardstop mechanism 1300 for a hinge of a computing device cover in accordance with one or more examples of the present disclosure. The features shown in FIG. 13 are applicable to the hardstops of hinge mechanism 1200. The hardstop mechanism 1300 is shown in a closed position 1302 and an open position 1304. The hardstop can include a first hinge portion 1306 that can be attached to the fixed portion of the computing device cover (e.g., 310) and a second hinge portion 1308 that can be attached to the rotatable portion of the computing device cover (e.g., 312), or vice versa. In some embodiments, the portion 1308 (which is attachable to the rotatable portion) is parallel to the base layer (e.g., 306) in the closed position. In the open position, the portion 1308 attached to the rotatable portion can be positioned at an angle relative to the portion

1306 attached to the fixed portion of the computing device cover. The hardstop mechanism 1300 can also include a raised lip 1310 which abuts the portion 1306 in the open position, stopping the portion 1308 from rotating any further relative to portion 1306. The raised lip 1310 may be an interference surface against which hinge portion 1306 is rotatable into contact. In some embodiments, portion 1306 includes a corresponding raised lip rotatable into contact with raised lip 1310.

Any of the features, components, parts, including the arrangements and configurations thereof shown in FIG. 13 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 13.

Figure 14:
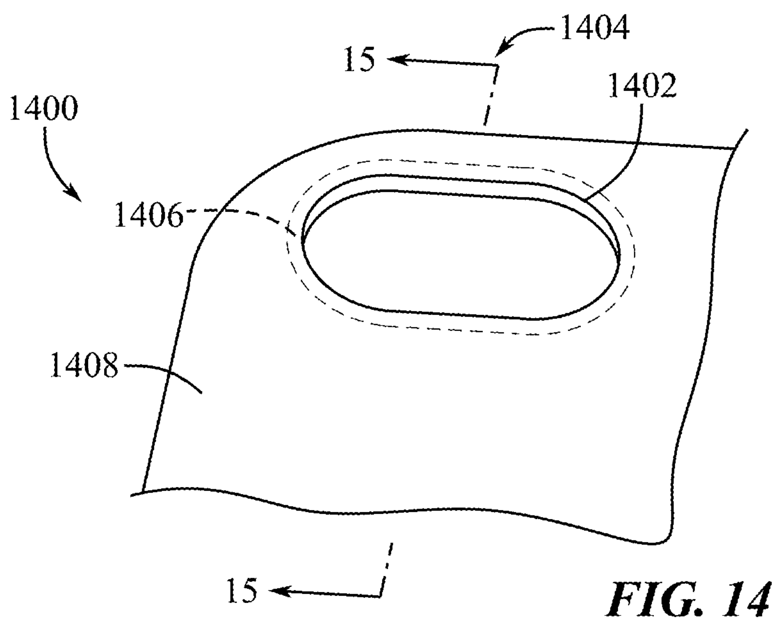
FIG. 14 illustrates a portion of an example computing device cover corresponding to a camera enclosure for a computing device.

FIG. 14 illustrates a portion of an example computing device cover 1400 corresponding to a camera enclosure 1402 for a computing device in accordance with one or more examples of the present disclosure. The computing device cover 1400 can include at least one aperture 1402 sized and shaped to receive a camera enclosure of the computing device. The aperture 1402 can extend through one or more layers of the computing device cover 1400. The computing device cover can also include a bumper guard 1406, which is indicated via dashed lines due to concealment beneath a fabric layer discussed below. The bumper guard is attached to the back panel 1408 and can protect a portion of the computing device that extends into the aperture.

Additionally or alternatively, the aperture 1402 can be sized and shaped to receive another type of sensor. As used herein, the term "sensor" refers to a device configured to sense, detect, capture, measure, or estimate certain properties (whether light, magnitude of magnetic field, voltage, resistance, movement, vibration, etc.). Thus, a sensor can generate sensor data (i.e., output electrical signals or reactive changes in electrical properties of the sensor) based on a detected property. Examples of a sensor include a camera, image sensor, light detector, optical transducer, photovoltaic sensor (e.g., solar cell), photoresistor, phototransistor, photodiode, photodetector, pyroelectric detector, etc. Additional examples of a sensor include an ambient light sensor, photometer, light meter, illuminance meter, radiometer, optometer, datalogger, lux meter, chroma meter, spectrometer, spectrophotometer, spectroradiometer, charge coupled device, active-pixel sensor, etc. Still, other examples of sensors include different sensing devices, such as a temperature device, oxygen device, movement device, brain activity device, sweat gland activity device, breathing activity device, muscle contraction device, etc. Some particular examples of sensors include an electrooculography sensor, electrocardiography sensor, EKG sensor, hear rate variability sensor, blood volume pulse sensor, SpO2 sensor, compact pressure sensor, electromyography sensor, core-body temperature sensor, galvanic skin sensor, accelerometer, gyroscope, magnetometer, inclinometer, barometer, infrared sensor, global positioning system sensor, fingerprint scanner, etc.

Any of the features, components, parts, including the arrangements and configurations thereof shown in FIG. 14 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 14.

Figure 15:
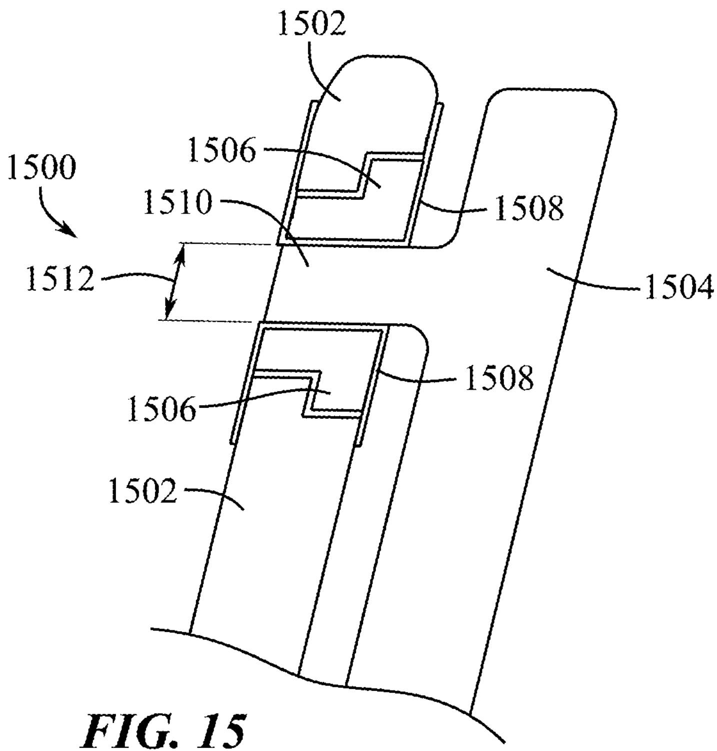
FIG. 15 illustrates a cross-section of a portion of a computing device positioned within an example computing device cover.

FIG. 15 illustrates a cross-section of a portion of a computing device 1504 positioned within an example computing device cover in accordance with one or more examples of the present disclosure. The cross-section 1500 is taken along the plane 1404 shown in FIG. 14. The cross-section 1500 shows a computing device shell that can include a rigid panel 1502. The rigid panel 1502 can be manufactured from fiberglass, plastic, metal, or composite materials. The cross-section 1500 also shows a portion of a computing device 1504 positioned within the aperture 1512. In some examples, the portion of the computing device 1504 positioned within the aperture 1402 can be a camera turret 1510, while in other examples a different sensor enclosure.

In some examples, the abutment of a rigid element such as the rigid backing 1502 can cause scratches, surface aberrations, or other damage to the portion of a computing device 1504. Therefore, the computing device shell can include protective component that at least partially surrounds an inner edge of the aperture 1402. Such a protective component includes a bumper guard 1506. In some embodiments, the bumper guard 1506 can be plastic. The bumper guard 1506 can be softer than the camera turret 1510 of the computing device 1504, thereby reducing or eliminating the ability for the rigid panel 1502 to scratch the camera turret 1510. Specifically, the bumper guard 1506 can include a material hardness that is less than a material hardness for the rigid panel 1502 (specifically, the rigid backing portion of the rigid panel 1502) as well as the camera turret 1510.

In these or other embodiments, the computing device case can include a fabric layer 1508. The fabric layer 1508 can be a microfiber layer or other cushioning material. Additionally or alternatively, the fabric layer 1508 can include a concealing fabric, a colored fabric, etc. In some examples, the fabric layer 1508 can further protect the camera turret 1510 from damage, and provide a frictional force to further secure the camera turret 1510 to the computing device shell. In at least one example, the fabric layer 1508 can wrap at least partially around a perimeter of the bumper guard 1506. In particular examples, the fabric layer 1508 can wrap around and cover a portion of the perimeter of the bumper guard 1506 that would otherwise be exposed within the aperture 1512. Similarly, in some examples, can wrap around and cover a portion of the perimeter of the bumper guard 1506 that would otherwise be exposed along inner or outer surfaces of the rigid panel 1502. The fabric layer 1508 may cover a gap or space between the bumper guard 1506 and the panel 1502 and may thereby hide the interface to give the surface a consistent, unitary, and continuous appearance. The fabric layer 1508 is shown extending partially along the inner and outer surfaces of the rigid panel 1502 in FIG. 15, but in some example embodiments, the fabric layer 1508 may extend across and cover the entire front and rear surfaces and/or around the terminal ends/sidewalls between the front and rear surfaces. In this manner, the fabric layer 1508 can visually conceal the bumper guard 1506 from an unaided human eye in certain instances.

Any of the features, components, parts, including the arrangements and configurations thereof shown in FIG. 15 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 15.

Figures 16, 17, 18:
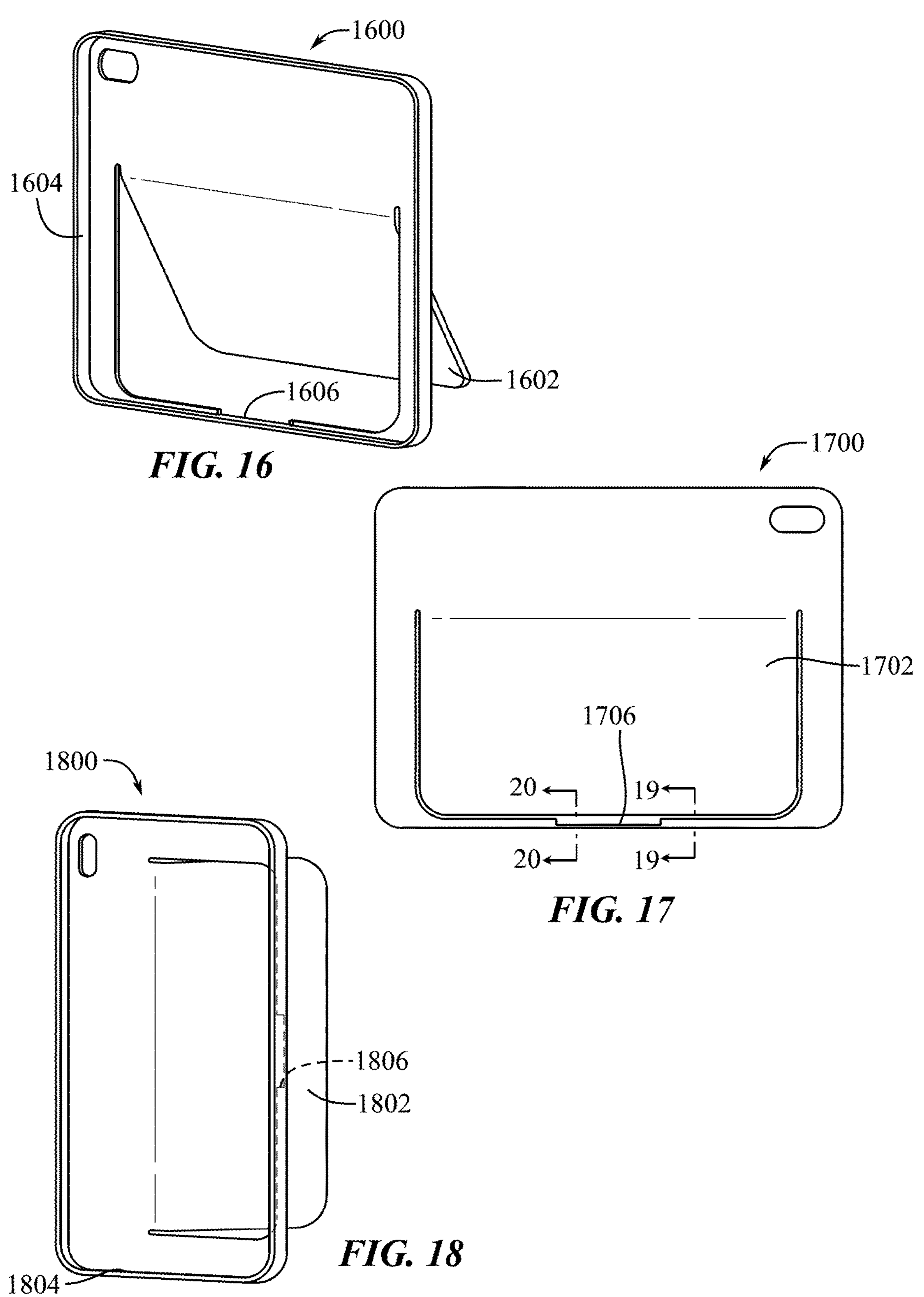
FIG. 16 illustrates a front perspective view of an example computing device cover.
FIG. 17 illustrates a rear view of the computing device cover of FIG. 16.
FIG. 18 illustrates another physical orientation of the computing device cover of FIGS. 16-17.

FIGS. 16-18 illustrate several example configurations of a computing device shell in accordance with one or more examples of the present disclosure. FIG. 16 illustrates a front perspective view of an example computing device cover 1600 in accordance with one or more embodiments of the current disclosure—where the kickstand (i.e., support portion 1602) extends out of plane relative to the computing device shell 1600. The computing device shell 1600 can include a support portion 1602 which can extend behind the computing device shell 1600 at an angle. The support portion 1602 can bear at least a portion of the weight of the computing device shell 1600 in the landscape position as shown. The computing device shell 1600 can also include sidewalls 1604. The sidewalls 1604 can retain the computing device within the volume defined by the computing device shell 1600.

In some embodiments, a sidewall 1604 can include a scoop 1606 or similar indentation to allow the user to grab and position the support portion 1602. The scoop can be wide enough and deep enough for a user to fit a portion of their fingers under the support portion to grip the support portion and displace it from the shell 1600.

FIG. 17 illustrates a rear view of the computing device cover of FIG. 16 in accordance with one or more examples of the present disclosure. As shown, the computing device shell 1700 can be of a unibody construction. The computing device cover 1700 can also include a scoop 1706 similar to the scoop 1606 shown in FIG. 16. FIG. 18 illustrates another physical orientation of the computing device cover of FIGS. 16-17 in accordance with one or more examples of the present disclosure. As shown, the shell 1800 can be used in portrait mode. In portrait mode, the support portion 1802 can support the computing device shell 1800 as it leans rearward. In the portrait configuration, a different edge (e.g., the bottom edge in FIG. 18) of the support portion 1802 can support the computing device shell 1800 than when in a landscape configuration (e.g., the bottom edge in FIGS. 16-17). The computing device cover 1800 can also include a scoop 1806 similar to the scoop 1606 shown in FIG. 16.

Any of the features, components, parts, including the arrangements and configurations thereof shown in FIGS. 16-18 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 16-18.

Figure 19:
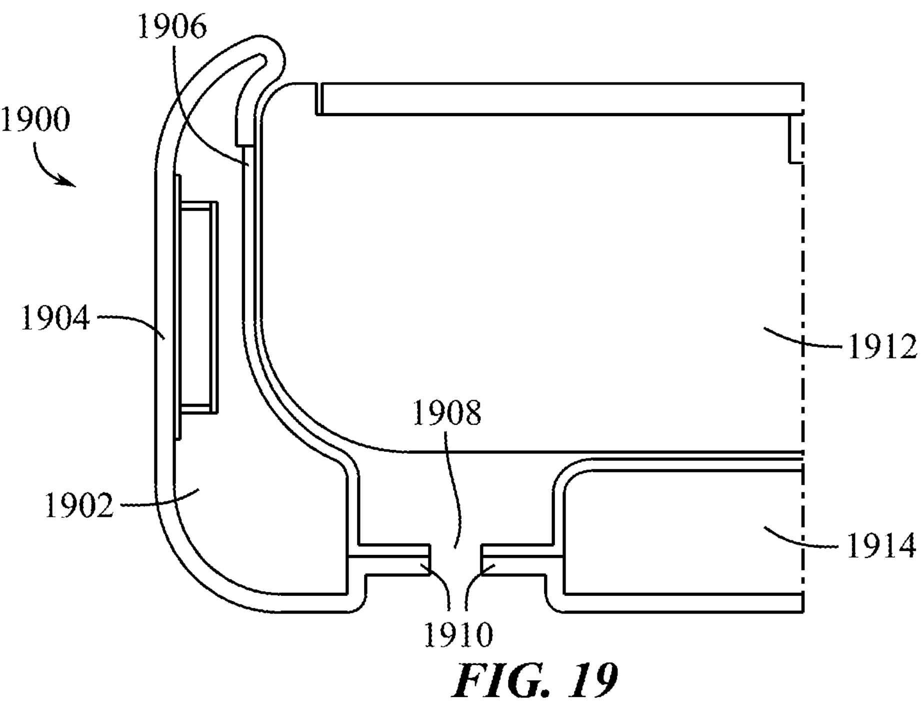
FIG. 19 illustrates a cross-section of a portion of an example computing device cover including an opening.

FIG. 19 illustrates a cross-section (as taken through section lines 19-19 in FIG. 17) of a portion of a system that includes a computing device shell 1900 and a computing device 1912 in accordance with one or more examples of the present disclosure. The computing device shell 1900 can include a sidewall 1902. The sidewall can be contoured such that a computing device attaches to and is retained by the computing device shell 1900. The sidewall 1902 can also be wrapped in at least one other material. Wrapping a three dimensional object with various curves, points, and other physical features in another material can prove problematic. Materials such as fabrics do not lay flat against these kinds of shapes, creating creases, folds, and wrinkles that can detract from the aesthetic of the computing device shell and the user experience. To overcome this, the sidewall 1902 can be designed to be compatible with at least one fabric wrapping.

In some embodiments, the sidewall 1902 can be wrapped in a first material 1904 and a second material 1906. This increases the difficulty presented by wrapping the sidewall 1902 in fabric materials. However, wrapping the computing device shell 1900 in another material 1904 such as microfiber can achieve an aesthetic look and comfortable feel for the user. The wrapping material 1904 can also serve as another protective layer, preventing scratched, cracks, and other damage to the computing device. By wrapping the sidewall 1902 in two materials, different properties can be selected for different portions of the sidewall 1902. For example, a high-friction material can be selected for the inner portion of the sidewall to increase the retention of the computing device 1912, while a soft material can be selected for the outer portion of the sidewall 1902 to facilitate a unique user experience.

The computing device shell 1900 can also include a support portion 1914. The support portion 1914 and the sidewall 1902 can define an aperture 1908. The aperture 1908 can be used as a point for the user to grab and position the support portion 1602. In some embodiments, the sidewall 1902 and the support portion 1914 can include flanges 1910 that protrude into the aperture 1908. The flanges 1910 can be made of the fabric materials used to wrap the sidewall 1902. The fabric material used in flanges 1910 can be selected for several properties, including stiffness, feel, durability, etc.

Any of the features, components, parts, including the arrangements and configurations thereof shown in FIG. 19 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 19.

Figure 20:
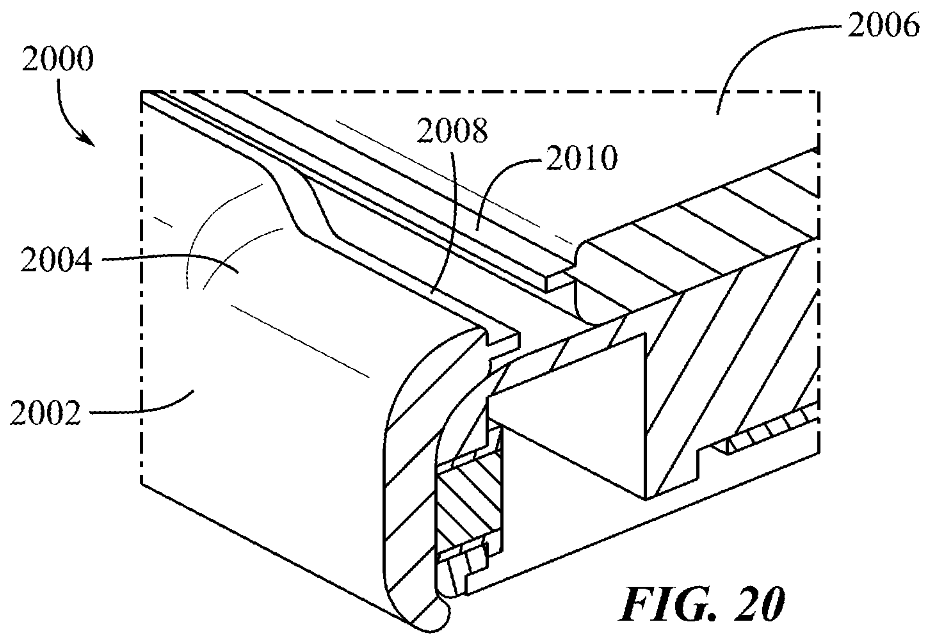
FIG. 20 illustrates a perspective view of a portion of an example computing device cover including an opening.

FIG. 20 illustrates a cross-sectional perspective view of a portion of an example computing device shell 2000 (e.g., shell 1700, as taken through section lines 20-20 in FIG. 17) with a computing device therein in accordance with one or more examples of the present disclosure. The computing device shell 2000 can include a sidewall 2002 with a scoop 2004. The computing device shell can also include a support portion 2006. The scoop 2004 can be used by the user to grab and position the support portion 2006. In some embodiments, the sidewall 2004 can include a flange 2008. The support portion 2006 can also include a flange 2010. These flanges 2008, 2010 can be made of a soft and flexible material to facilitate a comfortable user experience. The scoop can be located along the sidewall 2002 at any point where the support portion 2006 is adjacent to the sidewall 2002. The scoop 2004 can be deeper or shallower depending on ease of use or structural rigidity of the sidewall 2002.

Any of the features, components, parts, including the arrangements and configurations thereof shown in FIG. 20 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 20.

Figure 21:
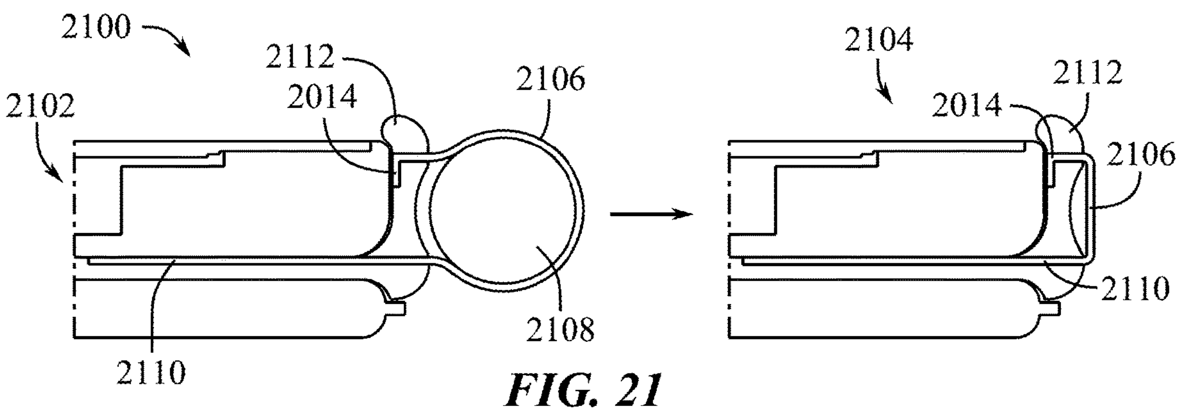
FIG. 21 illustrates an example computing device cover including an example adjustable loop for an electronic stylus.
Figure 22:
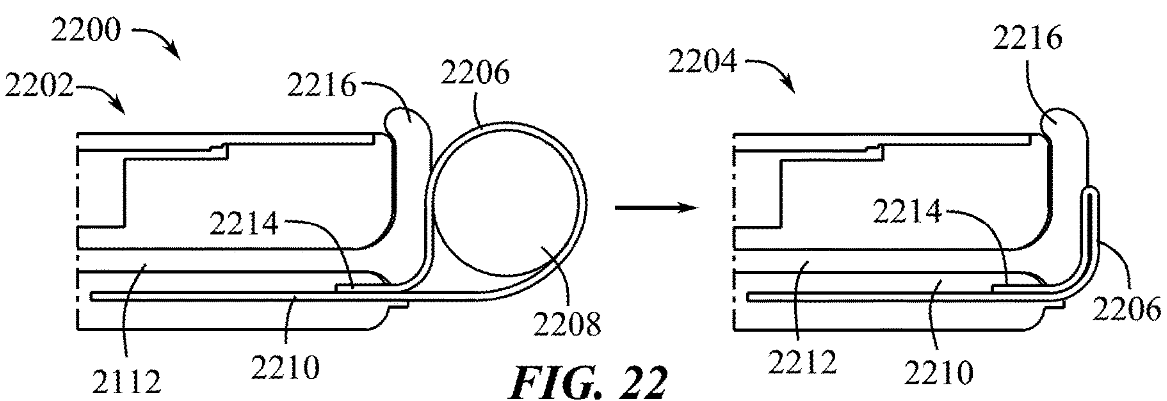
FIG. 22 illustrates another example computing device cover including another example adjustable loop for an electronic stylus.
Figure 23:
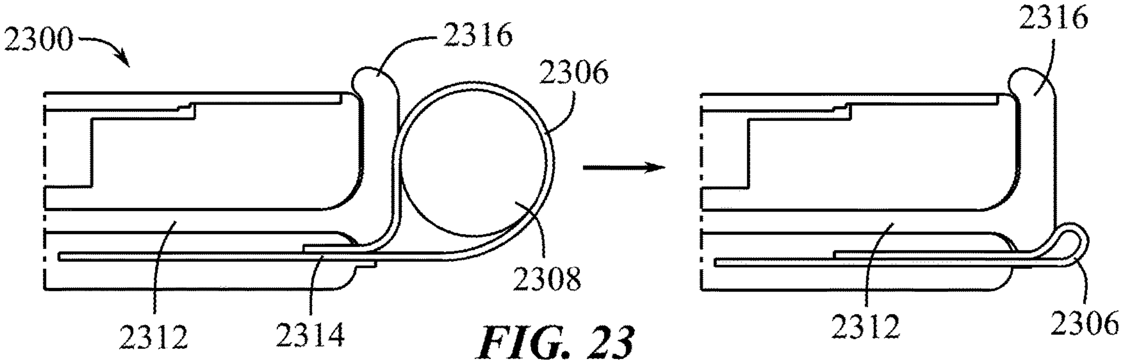
FIG. 23 illustrates another example computing device cover including yet another example adjustable loop for an electronic stylus.

FIGS. 21-23 illustrate some example dynamic retention systems for an electronic stylus in accordance with one or more examples of the present disclosure. As used herein, the term "electronic stylus" refers to an input device that can be used to write, draw, or interact with the display portion of a computing device. As used herein, "display portion" refers to a screen or other visual computer output device. Example types of a display include a light emitting diode (LED) display, quantum LED (QLED) display, organic LED (OLED) display, liquid crystal display, digital light processing display, plasma panel display, rear-projection display, a micro display, etc. The display portion may include capacitive touch capability.

FIG. 21 illustrates an example computing device cover 2100 including an example adjustable loop 2106 for an electronic stylus 2108 in accordance with one or more examples of the present disclosure. In some embodiments, the computing device cover 2100 can include an adjustable loop 2106. The adjustable loop 2106 can be attached to a computing device shell or cover 2112. In a configuration 2102, the adjustable loop 2106 can hold an electronic stylus 2108 in abutment with the computing device shell or cover 2112. In another configuration 2104, the adjustable loop 2106 can be retracted into the computing device shell or cover 2112. In some embodiments, one end 2114 can be secured to the computing device shell or cover 2112 by a variety of methods, including but not limited to an adhesive. A second end 2110 of the adjustable loop 2106 can be retracted into the computing device shell or cover 2112 spaced apart from the first end 2114 as shown in the configuration 2102. In this embodiment, the elastic properties of the adjustable loop 2106 can provide a force that secures the electronic stylus 2108. In some embodiments, the computing device cover or shell 2112 can include an indentation configured to receive an electronic stylus 2108. The indentation can match the curvature or shape of an electronic stylus, and can contribute to the retaining properties of the computing device cover 2100.

FIG. 22 illustrates another example computing device cover 2200 including another example adjustable loop 2206 for an electronic stylus 2208 in accordance with one or more examples of the present disclosure. The computing device cover 2200 differs from the computing device cover 2100 in several ways. In the computing device cover 2200, the first end 2214 and the second end 2210 of the adjustable loop 2206 are secured to the computing device shell or cover 2212 in the same location. The second end 2110 can be made of an elastic material and therefore retractable into the computing device shell or cover 2212 when not in use. When an electronic stylus is inserted, it abuts the adjustable loop 2206. In some embodiments, the adjustable loop 2206 can be partially attached to the sidewall 2216 of the computing device shell or cover 2112. In some examples, the adjustable loop 2206 can be attached using an adhesive. In particular embodiments, the bottom portion of the adjustable loop 2206 can be stiffened with an adhesive such that when an electronic stylus 2208 is inserted into the adjustable loop 2206, the electronic stylus 2208 is biased upwards and into the sidewall of the shell. This can make the electronic stylus 2208 easier to access and remove from the adjustable loop 2206.

FIG. 23 illustrates a computing device cover 2300 similar to the computing device cover 2200 shown in FIG. 22 in accordance with one or more examples of the present disclosure, with the exception that the adjustable loop 2306 is not attached to the sidewall 2316 of the computing device shell or cover 2312 past the attachment point 2314. A portion of the adjustable loop 2306 can also be exposed, allowing for insertion of an electronic stylus 2308.

Any of the features, components, parts, including the arrangements and configurations thereof shown in FIGS. 21-23 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 21-23.

Figure 24:
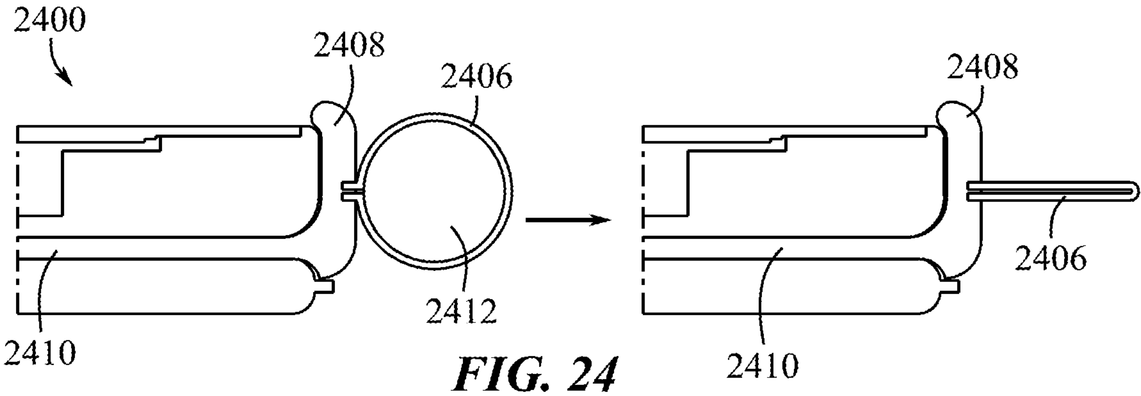
FIG. 24 illustrates an example computing device cover including an example adjustable loop for an electronic stylus.
Figure 25:
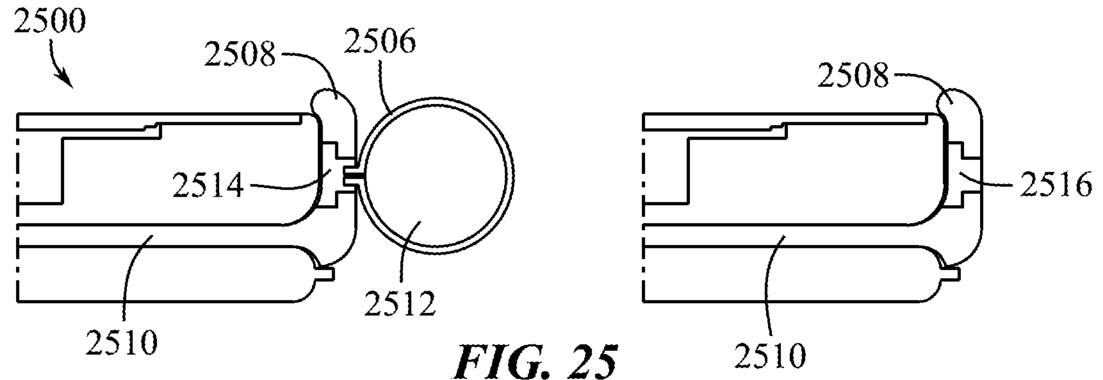
FIG. 25 illustrates another example computing device cover including another example adjustable loop for an electronic stylus.
Figure 26:
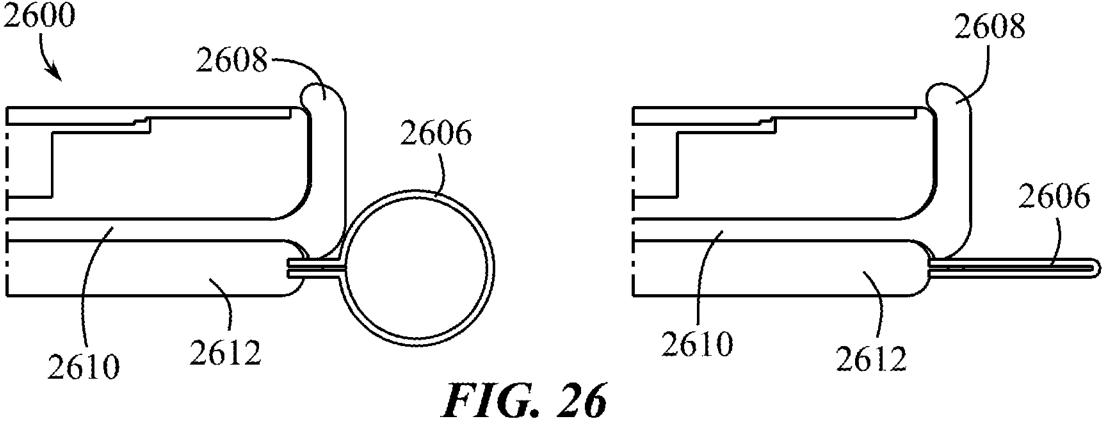
FIG. 26 illustrates another example computing device cover including yet another example adjustable loop for an electronic stylus.

FIGS. 24-26 illustrate additional implementations of an adjustable loop, including some example static retention systems for an electronic stylus in accordance with one or more examples of the present disclosure. FIG. 24 illustrates an example computing device cover 2400 including an example adjustable loop 2406 for an electronic stylus 2412 in accordance with one or more examples of the present disclosure. The static retention system 2400 can include a static loop 2406 attached to the sidewall 2408 of a computing device shell or cover 2410. In some embodiments, the static loop 2406 can be attached to the middle of the sidewall 2408. When an electronic stylus 2412 is retained by the static loop 2406, the static loop 2406 stretches to apply an elastic force upon the electronic stylus 2412. When an electronic stylus is not inserted into the static loop 2406, the static loop can lay flat as shown in FIG. 24.

FIG. 25 illustrates another example computing device cover 2500 including another example adjustable loop 2506 for an electronic stylus 2512 in accordance with one or more examples of the present disclosure that is similar to the static retention system 2400 shown in FIG. 24, except the static loop is attached to the sidewall 2508 via a removable insert 2514 that attached to an opening 2516.

FIG. 26 illustrates another example computing device cover 2600 including another example adjustable loop 2606 for an electronic stylus in accordance with one or more examples of the present disclosure that is similar to the static retention system 2400 shown in FIG. 24, except the static loop is attached to the support portion 2612 (e.g., a kickstand) instead of the sidewall 2408.

Any of the features, components, parts, including the arrangements and configurations thereof shown in FIGS. 24-26 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 24-26.

Figure 27:
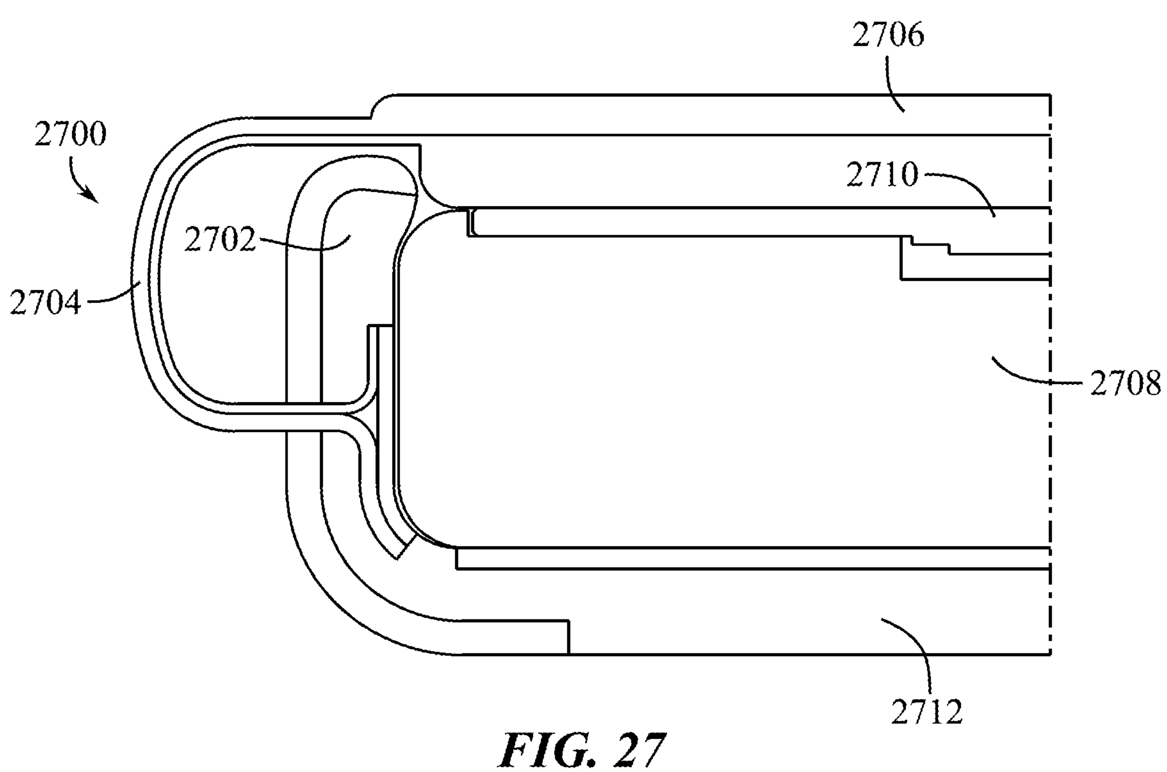
FIG. 27 illustrates a cross-section of an example computing device cover including front cover connected via a pass-through hinge.

FIG. 27 illustrates a cross-sectional end view of an example computing device shell 2700 including front cover 2706 connected via a pass-through hinge 2704 in accordance with one or more examples of the present disclosure. The computing device shell 2700 can include a sidewall 2702, a pass-through hinge 2704, and a front cover 2706. The front cover 2706 can protect the display portion 2710 of the computing device 2708. Additional functionality of the front cover 2706 is discussed in FIG. 28.

As used herein, a pass-through hinge refers to a hinge that extends through a portion of the computing device shell 2700. In some embodiments, the pass-through hinge 2704 can extend through the sidewall 2702 and be attached on the inner surface of the sidewall 2702 by any number of attachment methods. Conventional attachment of support mechanisms to computing device shells attach to the outer surface of the shell or cover, which can lead to premature failure, ripping, stretching, and loss of function.

To overcome this, the pass-through hinge 2704 is can be attached on the inner surface of the computing device shell. The pass-through hinge 2704 can be a fabric, plastic, or composite material. In particular embodiments, the pass-through hinge 2704 is a pliant or flexible connection between the sidewall and the front cover 2706. The pass-through hinge 2704 can also be manufactured from more than one layer of material to facilitate specific properties such as rigidity, durability, color, strength, flexibility, etc. The pass-through hinge 2704 can also be connected to the front cover 2706. The front cover 2706 can abut the display portion 2710 of a computing device 2708. The surface of the front cover 2706 that abuts the display portion 2710 can be made from a soft material to protect the display portion 2710. The front cover 2706 can also rotate around the computing device 2708 via the pass-through hinge 2704 to support the computing device 2708 from the side opposite the display portion 2710. In some embodiments, the pass-through hinge 2704 can be secured within the sidewall of the computing device shell 2712. The pass-through hinge 2704 can be secured using a T-shaped anchor or end portion. The use of a T-shaped anchor can increase the strength of the attachment, therefore increasing durability and robustness.

Any of the features, components, parts, including the arrangements and configurations thereof shown in FIG. 27 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 27.

Figure 28:
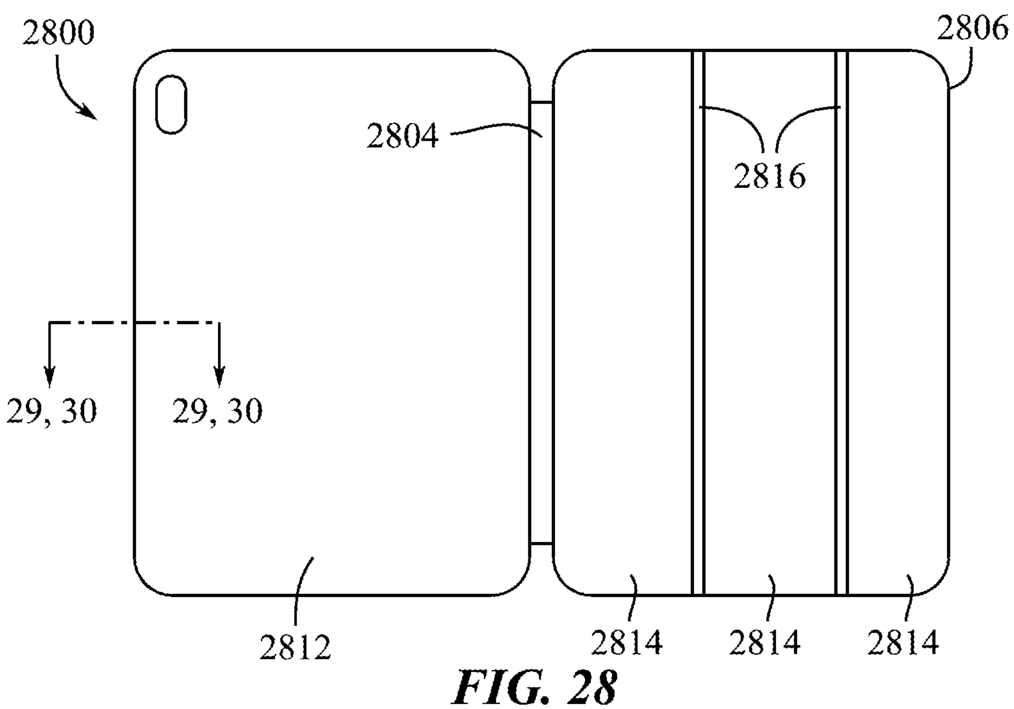
FIG. 28 illustrates a top view of the example computing device cover of FIG. 27 including a front cover.

FIG. 28 illustrates a top view of the example computing device cover of FIG. 27 including a front cover 2806 in accordance with one or more examples of the present disclosure. The computing device shell 2800 can include a back panel 2812 and a front cover 2806. The front cover 2806 can be attached to the back panel 2812 via a pass-through hinge 2804 as described in FIG. 27.

As depicted in FIG. 28, however, in some embodiments, the front cover 2806 can be separated into rigid sections 2814. The rigid sections 2814 can be connected by pliant materials 2816 such as fabrics. The rigid sections 2814 can fold to create a support portion (e.g., a triangular shaped support) that can bear at least some of the weight of a computing device, holding it upright.

Any of the features, components, parts, including the arrangements and configurations thereof shown in FIG. 28 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 28.

Figure 29:
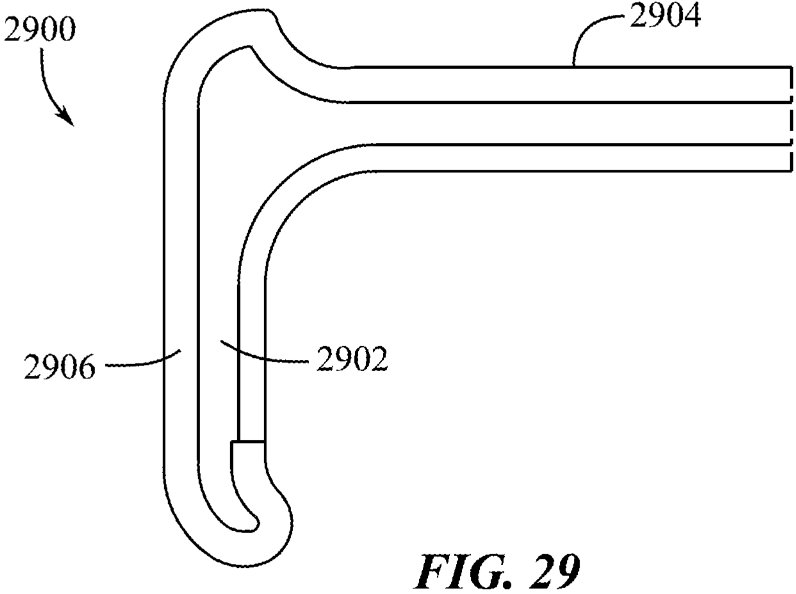
FIG. 29 illustrates a cross-section of an overmolded shell for a computing device cover.

FIG. 29 illustrates a cross-section of an overmolded shell 2900 for a computing device cover in accordance with one or more examples of the present disclosure. The computing device shell 2900 can include a sidewall 2902 and a concave portion 2904. The concave portion 2904 can receive a front cover or support portion, such as the support portion 2612 described above in relation to FIG. 26. The computing device shell can also be overmolded with a second material 2906. As used herein, "overmolding" refers to a process of attaching a second material around a three dimensional object such as a computing device shell using a molding process. The use of both an inner material for the sidewall 2902 and a second, overmolded, material 2906 can facilitate specific characteristics such as strength, color, durability, feel, etc. For example a more rigid material could be used to manufacture the sidewall 2902, giving the computing device shell strength. In addition to a rigid inner portion of the sidewall 2902, a soft outer material 2906 could provide a comfortable touch for the user, provide an adequate frictional force when set on another surface to prevent slippage, or change the color of the computing device shell 2900. Wrapping a three dimensional object with various curves, points, and other physical features in another material can prove problematic. Materials such as fabrics do not typically lay flat against these kinds of shapes, creating creases, folds, and wrinkles that can detract from the aesthetic of the computing device shell and the user experience. To overcome this, the sidewall 2902 can be designed to be compatible with a fabric wrapping.

Any of the features, components, parts, including the arrangements and configurations thereof shown in FIG. 29 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 29.

Figure 30:
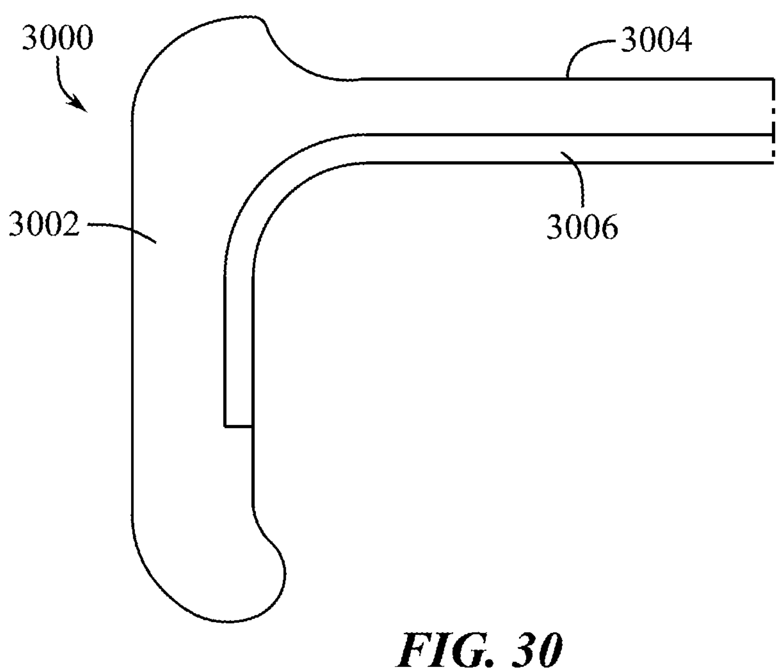
FIG. 30 illustrates a cross-section of another example computing device cover including a shell.

FIG. 30 illustrates a cross-section of another example computing device cover including a shell 3000 in accordance with one or more examples of the present disclosure that is similar to the computing device shell 2900 shown in FIG. 29, except the sidewall 3002 is manufactured from a single material. In such embodiments, the sidewall 3002 can be designed for ease of manufacturability, strength, or other characteristics because the computing device shell 3000 is not wrapped. The computing device shell 3000 can also include a scoop 3004 configured to receive a front cover or support portion. The scoop can provide a user with a way to grab the front cover or support portion and displace it relative to the computing device shell 3000. The computing device shell can also include an interior lining 3006 that can be a material designed to protect the computing device from scratches, aberrations, or other damage. The interior liner can be a material with a directional nap, such as microfiber, and provide frictional force to further secure the computing device.

Any of the features, components, parts, including the arrangements and configurations thereof shown in FIG. 30 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 30.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computing device cover, comprising:

a base layer;

a split layer, comprising:

a fixed portion attached to the base layer; and a rotation member pivotably connected to the fixed portion; and a fabric layer attached to the split layer and positioned between the base layer and the split layer, the fabric layer comprising:

a pre-drawn fabric positionable adjacent to the rotation member, the pre-drawn fabric comprising a predetermined tension for controlling kinematics of the rotation member relative to the fixed portion.

2. The computing device cover of claim 1, further comprising a concealed tearable area of the fabric layer positioned between the fixed portion of the split layer and the base layer.

3. The computing device cover of claim 1, further comprising a cap positioned over the rotation member.

4. The computing device cover of claim 3, wherein the pre-drawn fabric is positionable adjacent to an end portion of the cap.

5. The computing device cover of claim 3, wherein the cap is adhered to at least one of the split layer or the fabric layer.

6. The computing device cover of claim 1, wherein the fabric layer comprises a reinforced portion adjacent to the rotation member.

7. The computing device cover of claim 1, further comprising a hardstop configured to limit a range of rotation of the rotation member.

8. A computing device case, comprising:

a first layer;

a second layer partially attached to the first layer, a portion of the second layer comprising a support portion;

a set of connection members interspaced within the second layer, the set of connection members being rotatable relative to each other to provide a rotational degree of freedom for the support portion relative to the first layer; and a fabric layer positioned between the first layer and the second layer, the fabric layer comprising a tension control region defined by a combination of one or more stiffened areas and one or more flexible areas.

9. The computing device case of claim 8, wherein:

a position of the support portion relative to the second layer defines a hinge angle for the set of connection members; and the tension control region variably affects an amount of input torque required to rotate the support portion based on the hinge angle in response to application of a force to the support portion.

10. The computing device case of claim 9, further comprising a magnet positioned in at least one of the first layer or the support portion of the second layer, wherein in addition to the tension control region, the magnet is configured to variably affect the input torque to rotate the support portion.

11. The computing device case of claim 8, wherein the tension control region is positioned proximate to the set of connection members.

12. The computing device case of claim 8, wherein the tension control region comprises elongated fabric extensions interspaced by fabric cutouts.

13. The computing device case of claim 8, wherein the tension control region is at least partially concealed between the first layer and the second layer.

14. The computing device case of claim 8, wherein the tension control region comprises one or more areas stiffened with adhesive.

15. The computing device case of claim 8, wherein the set of connection members comprises friction hinges.

16. A computing device cover, comprising:

a back panel removably attachable to a computing device, the back panel comprising:

a first surface abuttable against the computing device; and a second surface opposing the first surface;

an upper panel comprising a hidden surface attached to the second surface;

a hinge comprising a hinge shape and a hinge position;

a kickstand rotatably attached to the upper panel via the hinge, the kickstand comprising a kickstand surface abuttable against the second surface;

a sheet of fabric covering the kickstand surface, the hinge, and the hidden surface, wherein the sheet of fabric visually conceals the hinge shape from an unaided human eye; and a stiffener positioned between the hinge and the sheet of fabric, wherein the sheet of fabric at the hinge is shaped to the stiffener.

17. The computing device cover of claim 16, wherein the sheet of fabric comprises:

a first predetermined tension or compression at a first hinge angle of the hinge; and a second predetermined tension or compression at a second hinge angle of the hinge, the second predetermined tension or compression differing from the first predetermined tension or compression.

18. The computing device cover of claim 16, wherein the sheet of fabric comprises a continuous sheet of fabric.

19. The computing device cover of claim 16, wherein the kickstand is rotatable relative to the back panel within a range extending from about 0 degrees to about 85 degrees.

* * * * *